US012493247B2

(12) United States Patent
Middlebrooks et al.

(10) Patent No.: US 12,493,247 B2
(45) Date of Patent: Dec. 9, 2025

(54) METHOD AND SYSTEM FOR PREDICTING PROCESS INFORMATION WITH A PARAMETERIZED MODEL

(71) Applicant: ASML Netherlands B.V., Veldhoven (NL)

(72) Inventors: Scott Anderson Middlebrooks, Duizel (NL); Patrick Warnaar, Tilburg (NL); Patrick Philipp Helfenstein, Eindhoven (NL); Alexander Prasetya Konijnenberg, Veldhoven (NL); Maxim Pisarenco, Son en Breugel (NL); Markus Gerardus Martinus Maria Van Kraaij, Eindhoven (NL)

(73) Assignee: ASML Netherlands B.V., Veldhoven (NL)

( * ) Notice: Subject to any disclaimer, the term of this patent is extended or adjusted under 35 U.S.C. 154(b) by 784 days.

(21) Appl. No.: 17/780,960

(22) PCT Filed: Sep. 28, 2020

(86) PCT No.: PCT/EP2020/077115
§ 371 (c)(1),
(2) Date: May 27, 2022

(87) PCT Pub. No.: WO2021/104718
PCT Pub. Date: Jun. 3, 2021

(65) Prior Publication Data
US 2023/0004096 A1     Jan. 5, 2023

(30) Foreign Application Priority Data

Nov. 29, 2019 (EP) .................................. 19212419
Jan. 10, 2020 (EP) .................................. 20151169

(51) Int. Cl.
*G03F 7/00* (2006.01)
*G06N 3/08* (2023.01)
(Continued)

(52) U.S. Cl.
CPC ...... *G03F 7/70633* (2013.01); *G03F 7/70525* (2013.01); *G03F 7/70675* (2013.01);
(Continued)

(58) Field of Classification Search
None
See application file for complete search history.

(56) References Cited

U.S. PATENT DOCUMENTS 6,952,253 B2   10/2005   Lof et al.
7,701,577 B2    4/2010   Straaijer et al.
(Continued)

FOREIGN PATENT DOCUMENTS

CA   2 961 847 A1    9/2018
CN   109073996 A    12/2018
(Continued)

OTHER PUBLICATIONS

International Search Report and Written Opinion of the International Searching Authority directed to related International Patent Application No. PCT/EP2020/077115, mailed Dec. 21, 2020; 12 pages.
(Continued)

*Primary Examiner* — Paul B Yanchus, III
(74) *Attorney, Agent, or Firm* — Sterne, Kessler, Goldstein & Fox P.L.L.C.

(57) ABSTRACT

A method and system for predicting complex electric field images with a parameterized model are described. A latent space representation of a complex electric field image is determined based on dimensional data in a latent space of the parameterized model for a given input to the parameter-
(Continued)

ized model. The given input may be a measured amplitude (e.g., intensity) associated with the complex electric field image. The complex electric field image is predicted based on the latent space representation of the complex electric field image. The predicted complex electric field image includes an amplitude and a phase. The parameterized model comprises encoder-decoder architecture. In some embodiments, determining the latent space representation of the electric field image comprises minimizing a function constrained by a set of electric field images that could be predicted by the parameterized model based on the dimensional data in the latent space and the given input.

13 Claims, 11 Drawing Sheets

(51) Int. Cl.
  *G06V 10/145* (2022.01)
  *G06V 10/82* (2022.01)
(52) U.S. Cl.
  CPC ............ *G06N 3/08* (2013.01); *G06V 10/145* (2022.01); *G06V 10/82* (2022.01)

(56) References Cited

U.S. PATENT DOCUMENTS

| | | |
|---|---|---|
| 7,791,724 B2 | 9/2010 | Den Boef et al. |
| 8,115,926 B2 | 2/2012 | Straaijer |
| 8,553,227 B2 | 10/2013 | Jordanoska |
| 8,681,312 B2 | 3/2014 | Straaijer |
| 8,692,994 B2 | 4/2014 | Straaijer |
| 8,792,096 B2 | 7/2014 | Straaijer |
| 8,797,554 B2 | 8/2014 | Straaijer |
| 8,823,922 B2 | 9/2014 | Den Boef |
| 2010/0328655 A1 | 12/2010 | Den Boef |
| 2011/0026032 A1 | 2/2011 | Den Boef et al. |
| 2011/0102753 A1 | 5/2011 | Van De Kerkhof et al. |
| 2011/0249244 A1 | 10/2011 | Leewis et al. |
| 2012/0044470 A1 | 2/2012 | Smilde et al. |
| 2013/0035888 A1 | 2/2013 | Kandel et al. |
| 2013/0162996 A1 | 6/2013 | Straaijer et al. |
| 2016/0161863 A1 | 6/2016 | Den Boef et al. |
| 2016/0370717 A1 | 12/2016 | Den Boef et al. |
| 2017/0345140 A1 | 11/2017 | Zhang et al. |
| 2018/0095037 A1* | 4/2018 | Tsuchiya ............ G01R 29/0892 |

FOREIGN PATENT DOCUMENTS

| | | |
|---|---|---|
| EP | 1 628 164 A | 2/2006 |
| EP | 2 942 847 A1 | 11/2015 |
| TW | 2012-45906 A | 11/2012 |
| WO | WO 2011/012624 A1 | 2/2011 |
| WO | WO 2018/153866 A1 | 8/2018 |
| WO | WO 2019/034409 A1 | 2/2019 |
| WO | WO 2020/109074 A1 | 6/2020 |
| WO | WO 2021/043551 A1 | 3/2021 |

OTHER PUBLICATIONS

Zharnikov et al., "Modification of thiol-derived self-assembling monolayers by electron and x-ray irradiation: Scientific and lithographic aspects," American Vacuum Society, Journal of Vacuum Science & Technology B, vol. 20, No. 5, Sep. 2002; pp. 1793-1807.
Kingma et al., "Auto-Encoding Variational Bayes," International Conference on Learning Representations (ICLR), May 2014; 15 pages.
Krebs et al., "Learning a Probabilistic Model for Diffeomorphic Registration," IEEE Transactions on Medical Imaging, vol. 38, No. 9, Sep. 2019; pp. 1-16.
Russell et al., "Hollow-core photonic crystal fibres for gas-based nonlinear optics," Nature Photonics, vol. 8, Mar. 28, 2014; pp. 278-286.
Adams et al., "Large-Area Nanopatterning of Self-Assembled Monolayers of Alkanethiolates by Interferometric Lithography," Langmuir, vol. 26, No. 16, Jul. 22, 2010; pp. 13600-13606.
Shamshad et al., "Robust Compressive Phase Retrieval via Deep Generative Priors," Machine Learning, Aug. 17, 2018; pp. 1-19.
Turchanin et al., "Fabrication of Molecular Nanotemplates in Self-Assembled Monolayers by Extreme-Ultraviolet-Induced Chemical Lithography," Small, vol. 3, No. 12, Dec. 4, 2007; pp. 2114-2119.
Chen et al., "Full-chip application of machine learning SRAFs on DRAM case using auto pattern selection," Proc. SPIE, vol. 10961, Optical Microlithography XXXII, Oct. 10, 2019; pp. 1-12.
Chinese Office Action directed to Chinese Patent Application No. 202080082760.5, mailed May 13, 2025; 28 pages.

* cited by examiner

METHOD AND SYSTEM FOR PREDICTING PROCESS INFORMATION WITH A PARAMETERIZED MODEL

CROSS REFERENCE TO RELATED APPLICATIONS

This application claims priority of EP application 19212419.6 which was filed on 2019 Nov. 29 and EP application 20151169.8 which was filed on 2020 Jan. 10 and whom are incorporated herein in their entirety by reference.

TECHNICAL FIELD

This description relates to a method and system for predicting process information with a parameterized model.

BACKGROUND

A lithographic apparatus is a machine constructed to apply a desired pattern onto a substrate. A lithographic apparatus can be used, for example, in the manufacture of integrated circuits (ICs). A lithographic apparatus may, for example, project a pattern (also often referred to as "design layout" or "design") at a patterning device (e.g., a mask) onto a layer of radiation-sensitive material (resist) provided on a substrate (e.g., a wafer).

To project a pattern on a substrate a lithographic apparatus may use electromagnetic radiation. The wavelength of this radiation determines the minimum size of features which can be formed on the substrate. Typical wavelengths currently in use are 365 nm (i-line), 248 nm, 193 nm and 13.5 nm. A lithographic apparatus, which uses extreme ultraviolet (EUV) radiation, having a wavelength within the range 4-20 nm, for example 6.7 nm or 13.5 nm, may be used to form smaller features on a substrate than a lithographic apparatus which uses, for example, radiation with a wavelength of 193 nm.

Low-$k_1$ lithography may be used to process features with dimensions smaller than the classical resolution limit of a lithographic apparatus. In such process, the resolution formula may be expressed as $CD=k_1 \times \lambda/NA$, where $\lambda$ is the wavelength of radiation employed, NA is the numerical aperture of the projection optics in the lithographic apparatus, CD is the "critical dimension" (generally the smallest feature size printed, but in this case half-pitch) and $k_1$ is an empirical resolution factor. In general, the smaller $k_1$ the more difficult it becomes to reproduce the pattern on the substrate that resembles the shape and dimensions planned by a circuit designer in order to achieve particular electrical functionality and performance.

To overcome these difficulties, sophisticated fine-tuning steps may be applied to the lithographic projection apparatus and/or design layout. These include, for example, but are not limited to, optimization of NA, customized illumination schemes, use of phase shifting patterning devices, various optimization of the design layout such as optical proximity correction (OPC, sometimes also referred to as "optical and process correction") in the design layout, or other methods generally defined as "resolution enhancement techniques" (RET). Alternatively, tight control loops for controlling a stability of the lithographic apparatus may be used to improve reproduction of the pattern at low k1.

SUMMARY

Various metrology operations may be used to measure features of a design. These operations may include measuring overlay, for example. Overlay can be determined based on computationally intensive determination of a complex electric field image associated with the design. Advantageously, the present method(s) and system(s) are configured for (less computationally intensive) prediction of complex electric field images, determination of one or more metrology metrics, and/or other operations with a parameterized model.

According to an embodiment, there is provided a method for predicting electric field images with a parameterized model. The method comprises determining, based on dimensional data in a latent space of the parameterized model, a latent space representation of an electric field image for a given input to the parameterized model; and predicting the electric field image based on the latent space representation of the electric field image.

In some embodiments, the electric field image comprises a complex electric field image having an amplitude and a phase.

In some embodiments, the given input comprises a measured amplitude associated with the complex electric field image.

In some embodiments, the amplitude comprises an intensity.

In some embodiments, determining the latent space representation of the electric field image comprises minimizing a function constrained by a set of electric field images that could be predicted by the parameterized model based on the dimensional data in the latent space and the given input.

In some embodiments, the latent space representation of the electric field image comprises a tensor.

In some embodiments, the parameterized model is a machine learning model.

In some embodiments, the parameterized model comprises encoder-decoder architecture.

In some embodiments, the encoder-decoder architecture comprises variational encoder-decoder architecture. The method further comprises training the variational encoder-decoder architecture with a probabilistic latent space, which generates realizations in an output space.

In some embodiments, the latent space comprises low dimensional encodings.

In some embodiments, the dimensional data in the latent space is encoded by an encoder of the encoder-decoder architecture.

In some embodiments, the method further comprises training the parameterized model with a training set of complex electric field images.

In some embodiments, the set of complex electric field images is generated during a through focus measurement.

In some embodiments, the training comprises encoding the complex electric field images in the training set into the dimensional data in the latent space, and transforming the dimensional data in the latent space into recovered versions of the complex electric field images in the training set to facilitate verification of the training.

In some embodiments, the method further comprises iteratively providing additional complex electric field images as input to the parameterized model. The additional complex electric field images are determined based on an extent to which the recovered versions of the complex electric field images match the complex electric field images in the training set.

In some embodiments, the method further comprises encoding, with the encoder, higher dimensional data associated with the electric field images into the dimensional data in the latent space.

In some embodiments, predicting the electric field image based on the latent space representation of the electric field image comprises passing the latent space representation of the electric field image through a decoder of the encoder-decoder architecture.

In some embodiments, the method further comprises determining a metrology metric based on the latent space representation of the electric field image.

In some embodiments, determining the metrology metric based on the latent space representation of the electric field image comprises providing the latent space representation of the electric field image to a regression network that is included in or separate from the parameterized model.

In some embodiments, the metrology metric is overlay.

In some embodiments, the method further comprises correcting for aberrations associated with a metrology apparatus based on the latent space representation of the electric field image and/or the predicted electric field image.

In some embodiments, the method further comprises determining, based on the predicted electric field image, adjustments to semiconductor manufacturing process parameters for patterning substrate geometry as part of a semiconductor manufacturing process.

According to another embodiment, there is provided a non-transitory computer readable medium having instructions thereon, the instructions when executed by a computer implementing any of the methods described herein.

According to another embodiment, there is provided a metrology apparatus configured to determine one or more metrology metrics for a semiconductor manufacturing process. The apparatus comprises one or more processors configured to: determine, based on dimensional data in a latent space of a parameterized model, a latent space representation of an electric field image for a given input; predict, with the parameterized model, the electric field image based on the latent space representation of the electric field image; and determine the one or more metrology metrics for the semiconductor manufacturing process based on the predicted electric field image.

According to another embodiment, there is provided lithographic cell comprising a metrology apparatus. The metrology apparatus is configured to: determine, based on dimensional data in a latent space of a parameterized model, a latent space representation of an electric field image for a given input; predict, with the parameterized model, the electric field image based on the latent space representation of the electric field image; and determine one or more metrology metrics for the semiconductor manufacturing process based on the predicted electric field image.

According to another embodiment, there is provided a method for determining one or more metrology metrics for a semiconductor manufacturing process. The method comprises: determining, based on dimensional data in a latent space of a parameterized model, a latent space representation of an electric field image for a given input; predicting, with the parameterized model, the electric field image based on the latent space representation of the electric field image; and determining the one or more metrology metrics for the semiconductor manufacturing process based on the predicted electric field image.

In some embodiments, the electric field image comprises a complex electric field image having an amplitude and a phase.

In some embodiments, the one or more determined metrology metrics comprise one or more of overlay, a critical dimension, a reconstruction of a three dimensional profile of features of a substrate, or a dose or focus of a lithography apparatus at a moment when the features of the substrate were printed with the lithography apparatus.

In some embodiments, the given input comprises a measured amplitude associated with the complex electric field image.

In some embodiments, the amplitude comprises an intensity.

In some embodiments, the method comprises adjusting one or more semiconductor manufacturing process parameters based on the determined one or more metrology metrics.

According to another embodiment, there is provided a method for predicting process information with a parameterized model, comprising: determining, in a latent space of the parameterized model, a latent space representation of a given input to the parameterized model; transforming the latent space representation of the given input, based on a reference latent space representation for the given input, into a transformed latent space representation of the given input; and predicting the process information based on the transformed latent space representation of the given input.

In some embodiments, the given input is associated with a target, and received from one of a plurality of target characterization apparatuses configured to generate the given input. It should be noted that "target" is used broadly and may refer to any features and/or structure in any substrate, layer, or other portion of a of a device and/or other physical object that is imaged, measured, or otherwise characterized in one way or another. This may include, for example, a metrology target and/or other measurement structures. The targets may be located inside or outside product areas on a wafer, for example.

In some embodiments, the transforming and predicting are configured such that the predicted process information for the target is the same, independent of which one of the target characterization apparatuses generated the given input.

In some embodiments, the transforming comprises one or more mathematical operations performed on the latent space representation of the given input.

In some embodiments, the transforming is performed in the latent space.

In some embodiments, the reference latent space representation comprises a weighted combination and/or an average of latent space representations of previously received inputs to the parameterized model, or a latent space representation of an input from a specific target characterization apparatus configured to generate the given input.

In some embodiments, the process information and the given input are associated with a semiconductor manufacturing process.

In some embodiments, the predicted process information comprises one or more of a predicted image, or a predicted process measurement. It should be noted that "image" is used broadly and may refer to any image generated (e.g., measured, predicted, acquired, etc.) during a manufacturing process. This may include, for example, in the context of semiconductor devices, field-plane acquisitions, pupil plane acquisitions, and/or other images.

In some embodiments, the predicted process measurement comprises one or more of a metrology metric, an xyz position, a dimension, an electric field, a wavelength, an illumination and/or detection pupil, a bandwidth, an illumination and/or detection polarization angle, or an illumination and/or a detection retardance angle.

In some embodiments, the given input comprises one or more of an input image, or an input process measurement.

According to another embodiment, there is provided a method for predicting process information with a parameterized model, comprising: determining, based on dimensional data, in a latent space of the parameterized model, a latent space representation of an optimum set of process parameters associated with a given input to the parameterized model; and predicting the process information based on the latent space representation of the optimum set of process conditions.

In some embodiments, the predicted process information comprises one or more of a design parameter, or a metrology measurement recipe parameter, for a target.

In some embodiments, the design parameter comprises one or more of a critical dimension, a pitch, a segmentation pitch, line geometry, contact geometry, or hole geometry associated with the target.

In some embodiments, the metrology measurement recipe parameter comprises one or more of a wavelength, a bandwidth, an aperture, an illumination and/or detection pupil, a bandwidth, an illumination and/or detection polarization angle, an illumination and/or a detection retardance angle, or a dose for measuring the target.

In some embodiments, the optimum set of process parameters define optimum measurement conditions for measuring a metrology metric for a target.

In some embodiments, the optimum set of process parameters comprise one or more of an intensity, a contrast, an edge response, a diffraction efficiency, or an overlay sensitivity.

In some embodiments, the given input comprises one or more of a defined design parameter, or a defined metrology measurement recipe parameter, for a target.

In some embodiments, the parameterized model is a machine learning model.

In some embodiments, the parameterized model comprises encoder-decoder architecture.

In some embodiments, the latent space comprises low dimensional encodings.

According to another embodiment, there is provided a method for predicting process information with a parameterized model, comprising: determining, in a latent space of the parameterized model, a latent space representation of a given input to the parameterized model; transforming the latent space representation of the given input, based on a reference latent space representation for the given input, into a transformed latent space representation of the given input; determining, based on the transformed latent space representation, a latent space representation of an optimum set of process parameters associated with the given input; and predicting the process information based on the transformed latent space representation of the given input and the latent space representation of the optimum set of process parameters associated with the given input.

According to another embodiment, there is provided a method for predicting process information with a parameterized model, comprising: determining, in a latent space of the parameterized model, a latent space representation of a given input to the parameterized model; transforming the latent space representation of the given input, based on a reference latent space representation for the given input, into a transformed latent space representation of the given input; determining, based on the transformed latent space representation of the given input, a latent space representation of an electric field image for the given input; determining, based on the transformed latent space representation, a latent space representation of an optimum set of process parameters associated with the given input; and predicting the process information based on the transformed latent space representation of the given input, the latent space representation of the electric field image, and the latent space representation of the optimum set of process parameters associated with the given input.

According to another embodiment, there is provided a non-transitory computer readable medium having instructions thereon, the instructions when executed by a computer implementing the method of any of the embodiments described above.

BRIEF DESCRIPTION OF THE DRAWINGS

The accompanying drawings, which are incorporated in and constitute a part of the specification, illustrate one or more embodiments and, together with the description, explain these embodiments. Embodiments of the invention will now be described, by way of example only, with reference to the accompanying schematic drawings in which corresponding reference symbols indicate corresponding parts, and in which.

DETAILED DESCRIPTION

Figure 1:
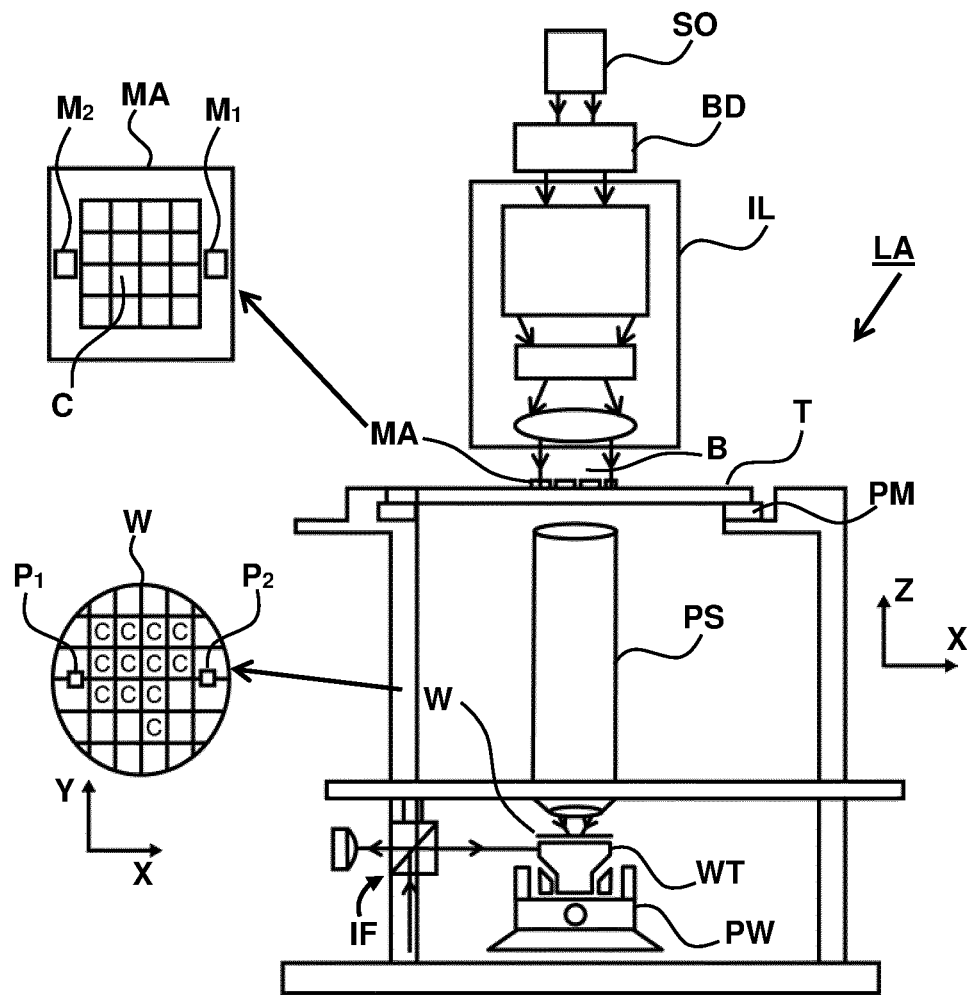
FIG. 1 depicts a schematic overview of a lithographic apparatus, according to an embodiment.

Process information (e.g., images, measurements, process parameters, metrology metrics, etc.) may be used to guide various manufacturing operations. Predicting or otherwise determining the process information with a parameterized model as described herein may be faster, more efficient, require fewer computing resources, and/or have other advantages over prior methods for determining process information.

Phase retrieval, for example, may be used for determination of a complex electric field image. The complex electric field image may be associated with a target. The target may be a portion of a semiconductor device (e.g., a portion of a pattern and/or features patterned in a substrate), and/or other targets, for example. As described above, it should be noted that "target" is used broadly and refers to any features and/or structure in any substrate, layer, or other portion of a of a device and/or other physical object that is imaged, measured, or otherwise characterized in one way or another. The complex electric field image may be used, in turn, to determine one or more metrology metrics such as overlay, for example, and/or other information for the target.

Phase retrieval comprises recovering a complex (valued) electric field from corresponding amplitude (e.g., intensity) measurements (e.g., for a particular target). Phase retrieval is difficult due to a large number of unknowns (e.g., on the order of $10^6$), nonlinearity, and non-convexity associated with the equation satisfied by the complex electric field. Existing approaches for phase retrieval include introducing redundancy in the amplitude measurements or exploiting prior knowledge about the complex electric field image (e.g., to reduce the number of unknowns). These and other approaches require redundant data, making assumptions, are computationally intensive, and/or have other disadvantages.

In contrast, the present method(s) and system(s) are configured for prediction of complex electric field images with a parameterized model. Prediction of complex electric field images with a parameterized model may be less computationally intensive and/or have other advantages compared to prior methods. The parameterized model is configured to significantly reduce the dimensionality of the phase retrieval problem, which can then be solved using a gradient-based optimization scheme (for example) in few dimensions.

As another example, data from different process sensors and/or tools may be different, even for the same measured or imaged target. Prior attempts to resolve these differences include physically adjusting the components of one or more of the sensors or tools, adjusting measuring or imaging parameters on a given sensor or tool, and/or making other adjustments to bring data from a particular sensor or tool into better agreement with data from other sensors or tools. However, these adjustments are not always applied consistently, depend on human judgement and/or a particular arrangement of physical components, and/or have other disadvantages.

In contrast, the present method(s) and system(s) are configured to determine, in one or more latent spaces of a parameterized model (where there are fewer dimensions of data to analyze compared to the number of dimensions in the raw data from the different sensors and/or tools), a latent space representation of a given input to the parameterized model. The latent space representation is transformed, based on a reference latent space representation for the given input, into a transformed latent space representation of the given input; and process information is predicted based on the transformed latent space representation of the given input. For example, the given input may be associated with a target, and received from one of a plurality of different sensors and/or tools configured to generate the given input. The transforming and predicting are configured such that predicted and/or otherwise determined process information (e.g., images, measurements, process parameters, metrology metrics, etc.) from the parameterized model, for the target, is the same, independent of which one of the sensors and/or tools generated the given input.

As a third example, operations such as target design, manufacturing recipe determination, and/or other operations often require iterative experimentation where selected design or recipe variables are purposefully adjusted in each iteration, while other variables remain fixed for that iteration. Each iteration often requires various measurements to be recorded and analyzed. After several iterations, a particular target design, or manufacturing recipe may be chosen (e.g., by a process of elimination and/or a different method).

In contrast, the present method(s) and system(s) are configured to determine, based on dimensional data in one or more latent spaces of a parameterized model (again, where there are fewer dimensions of data to analyze compared to the number of dimensions in raw data from the different experimental iterations), a latent space representation of an optimum set of process parameters associated with a given input to the parameterized model. The given input may comprise required (e.g., unchangeable because of design requirements, machine capability, physics, etc.) elements of a target design, or manufacturing recipe, for example, or other input. The presents system(s) and method (s) are configured to predict and/or otherwise determine process information such as an optimum target design or manufacturing recipe based on the latent space representation of the optimum set of process conditions.

These examples are not intended to be limiting. It should also be noted that one or more parameterized models may perform some or all of the operations described above. For example, one parameterized model may be trained to predict complex electric field images, transform data from different sensors and/or tools such that data for the same target matches, and determine an optimum target design and/or manufacturing recipe; or these different operations may be performed by different parameterized models. The different applications (predicting complex electric field images, transforming data from different sensors and/or tools such that data for the same target from different sensors and/or tools still matches, and determining an optimum target design and/or manufacturing recipe) may be used together, or they may be used separately.

In addition, although specific reference may be made in this text to the manufacture of ICs, the description herein has many other possible applications. For example, it may be employed in the manufacture of integrated optical systems, guidance and detection patterns for magnetic domain memories, liquid-crystal display panels, thin-film magnetic heads, etc. In these alternative applications, the skilled artisan will appreciate that, in the context of such alternative applications, any use of the terms "reticle", "wafer" or "die" in this text should be considered as interchangeable with the more general terms "mask", "substrate" and "target portion", respectively. In addition, it should be noted that the method described herein may have many other possible applications in diverse fields such as language processing systems, self-driving cars, medical imaging and diagnosis, semantic segmentation, denoising, chip design, electronic design automation, etc. The present method may be applied in any fields where quantifying uncertainty in machine learning model predictions is advantageous.

In the present document, the terms "radiation" and "beam" are used to encompass all types of electromagnetic radiation, including ultraviolet radiation (e.g. with a wavelength of 365, 248, 193, 157 or 126 nm) and EUV (extreme ultra-violet radiation, e.g. having a wavelength in the range of about 5-100 nm).

A patterning device may comprise, or may form, one or more design layouts. The design layout may be generated utilizing CAD (computer-aided design) programs. This process is often referred to as EDA (electronic design automation). Most CAD programs follow a set of predetermined design rules in order to create functional design layouts/patterning devices. These rules are set based processing and design limitations. For example, design rules define the space tolerance between devices (such as gates, capacitors, etc.) or interconnect lines, to ensure that the devices or lines do not interact with one another in an undesirable way. One or more of the design rule limitations may be referred to as a "critical dimension" (CD). A critical dimension of a device can be defined as the smallest width of a line or hole, or the smallest space between two lines or two holes. Thus, the CD regulates the overall size and density of the designed device. One of the goals in device fabrication is to faithfully reproduce the original design intent on the substrate (via the patterning device).

The term "reticle," "mask," or "patterning device" as employed in this text may be broadly interpreted as referring to a generic patterning device that can be used to endow an incoming radiation beam with a patterned cross-section, corresponding to a pattern that is to be created in a target portion of the substrate. The term "light valve" can also be used in this context. Besides the classic mask (transmissive or reflective; binary, phase-shifting, hybrid, etc.), examples of other such patterning devices include a programmable mirror array.

As a brief introduction, FIG. 1 schematically depicts a lithographic apparatus LA. The lithographic apparatus LA includes an illumination system (also referred to as illuminator) IL configured to condition a radiation beam B (e.g., UV radiation, DUV radiation or EUV radiation), a mask support (e.g., a mask table) T constructed to support a patterning device (e.g., a mask) MA and connected to a first positioner PM configured to accurately position the patterning device MA in accordance with certain parameters, a substrate support (e.g., a wafer table) WT configured to hold a substrate (e.g., a resist coated wafer) W and coupled to a second positioner PW configured to accurately position the substrate support in accordance with certain parameters, and a projection system (e.g., a refractive projection lens system) PS configured to project a pattern imparted to the radiation beam B by patterning device MA onto a target portion C (e.g., comprising one or more dies) of the substrate W.

In operation, the illumination system IL receives a radiation beam from a radiation source SO, e.g. via a beam delivery system BD. The illumination system IL may include various types of optical components, such as refractive, reflective, magnetic, electromagnetic, electrostatic, and/or other types of optical components, or any combination thereof, for directing, shaping, and/or controlling radiation. The illuminator IL may be used to condition the radiation beam B to have a desired spatial and angular intensity distribution in its cross section at a plane of the patterning device MA.

The term "projection system" PS used herein should be broadly interpreted as encompassing various types of projection system, including refractive, reflective, catadioptric, anamorphic, magnetic, electromagnetic and/or electrostatic optical systems, or any combination thereof, as appropriate for the exposure radiation being used, and/or for other factors such as the use of an immersion liquid or the use of a vacuum. Any use of the term "projection lens" herein may be considered as synonymous with the more general term "projection system" PS.

The lithographic apparatus LA may be of a type wherein at least a portion of the substrate may be covered by a liquid having a relatively high refractive index, e.g., water, so as to fill a space between the projection system PS and the substrate W—which is also referred to as immersion lithography. More information on immersion techniques is given in U.S. Pat. No. 6,952,253, which is incorporated herein by reference.

The lithographic apparatus LA may also be of a type having two or more substrate supports WT (also named "dual stage"). In such "multiple stage" machine, the substrate supports WT may be used in parallel, and/or steps in preparation of a subsequent exposure of the substrate W may be carried out on the substrate W located on one of the substrate support WT while another substrate W on the other substrate support WT is being used for exposing a pattern on the other substrate W.

In addition to the substrate support WT, the lithographic apparatus LA may comprise a measurement stage. The measurement stage is arranged to hold a sensor and/or a cleaning device. The sensor may be arranged to measure a property of the projection system PS or a property of the radiation beam B. The measurement stage may hold multiple sensors. The cleaning device may be arranged to clean part of the lithographic apparatus, for example a part of the projection system PS or a part of a system that provides the immersion liquid. The measurement stage may move beneath the projection system PS when the substrate support WT is away from the projection system PS.

In operation, the radiation beam B is incident on the patterning device, e.g. mask, MA which is held on the mask support MT, and is patterned by the pattern (design layout) present on patterning device MA. Having traversed the mask MA, the radiation beam B passes through the projection system PS, which focuses the beam onto a target portion C of the substrate W. With the aid of the second positioner PW and a position measurement system IF, the substrate support WT can be moved accurately, e.g., so as to position different target portions C in the path of the radiation beam B at a focused and aligned position. Similarly, the first positioner PM and possibly another position sensor (which is not explicitly depicted in FIG. 1) may be used to accurately position the patterning device MA with respect to the path of the radiation beam B. Patterning device MA and substrate W may be aligned using mask alignment marks M1, M2 and substrate alignment marks P1, P2. Although the substrate alignment marks P1, P2 as illustrated occupy dedicated target portions, they may be located in spaces between target portions. Substrate alignment marks P1, P2 are known as scribe-lane alignment marks when these are located between the target portions C.

Figure 2:
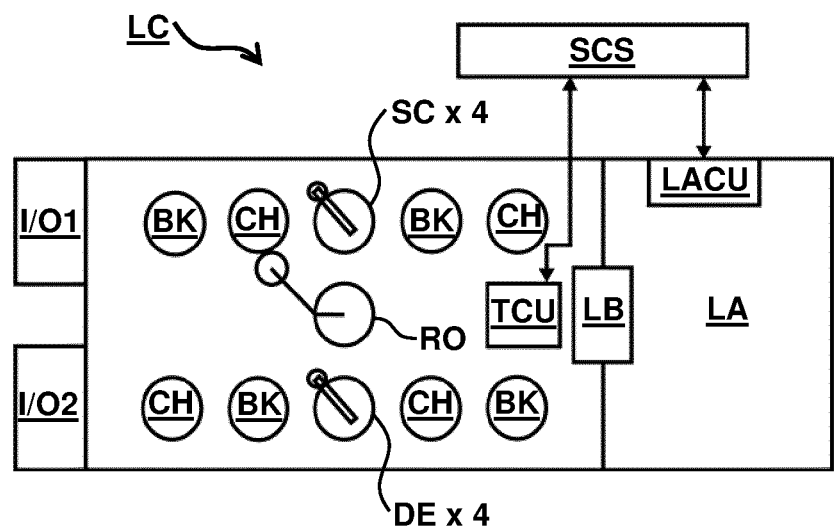
FIG. 2 depicts a schematic overview of a lithographic cell, according to an embodiment.

FIG. 2 depicts a schematic overview of a lithographic cell LC. As shown in FIG. 2 the lithographic apparatus LA may form part of lithographic cell LC, also sometimes referred to as a lithocell or (litho)cluster, which often also includes apparatus to perform pre- and post-exposure processes on a substrate W. Conventionally, these include spin coaters SC configured to deposit resist layers, developers DE to develop exposed resist, chill plates CH and bake plates BK, e.g. for conditioning the temperature of substrates W e.g. for conditioning solvents in the resist layers. A substrate handler, or robot, RO picks up substrates W from input/output ports I/O1, I/O2, moves them between the different process apparatus and delivers the substrates W to the loading bay LB of the lithographic apparatus LA. The devices in the lithocell, which are often also collectively referred to as the track, are typically under the control of a track control unit TCU that in itself may be controlled by a supervisory control system SCS, which may also control the lithographic apparatus LA, e.g. via lithography control unit LACU.

In order for the substrates W (FIG. 1) exposed by the lithographic apparatus LA to be exposed correctly and consistently, it is desirable to inspect substrates to measure properties of patterned structures, such as overlay errors between subsequent layers, line thicknesses, critical dimensions (CD), etc. For this purpose, inspection tools (not shown) may be included in the lithocell LC. If errors are detected, adjustments, for example, may be made to exposures of subsequent substrates or to other processing steps that are to be performed on the substrates W, especially if the inspection is done before other substrates W of the same batch or lot are still to be exposed or processed.

An inspection apparatus, which may also be referred to as a metrology apparatus, is used to determine properties of the substrates W (FIG. 1), and in particular, how properties of different substrates W vary or how properties associated with different layers of the same substrate W vary from layer to layer. The inspection apparatus may alternatively be constructed to identify defects on the substrate W and may, for example, be part of the lithocell LC, or may be integrated into the lithographic apparatus LA, or may even be a stand-alone device. The inspection apparatus may measure the properties on a latent image (image in a resist layer after the exposure), or on a semi-latent image (image in a resist layer after a post-exposure bake step PEB), or on a developed resist image (in which the exposed or unexposed parts of the resist have been removed), or even on an etched image (after a pattern transfer step such as etching).

Figure 3:
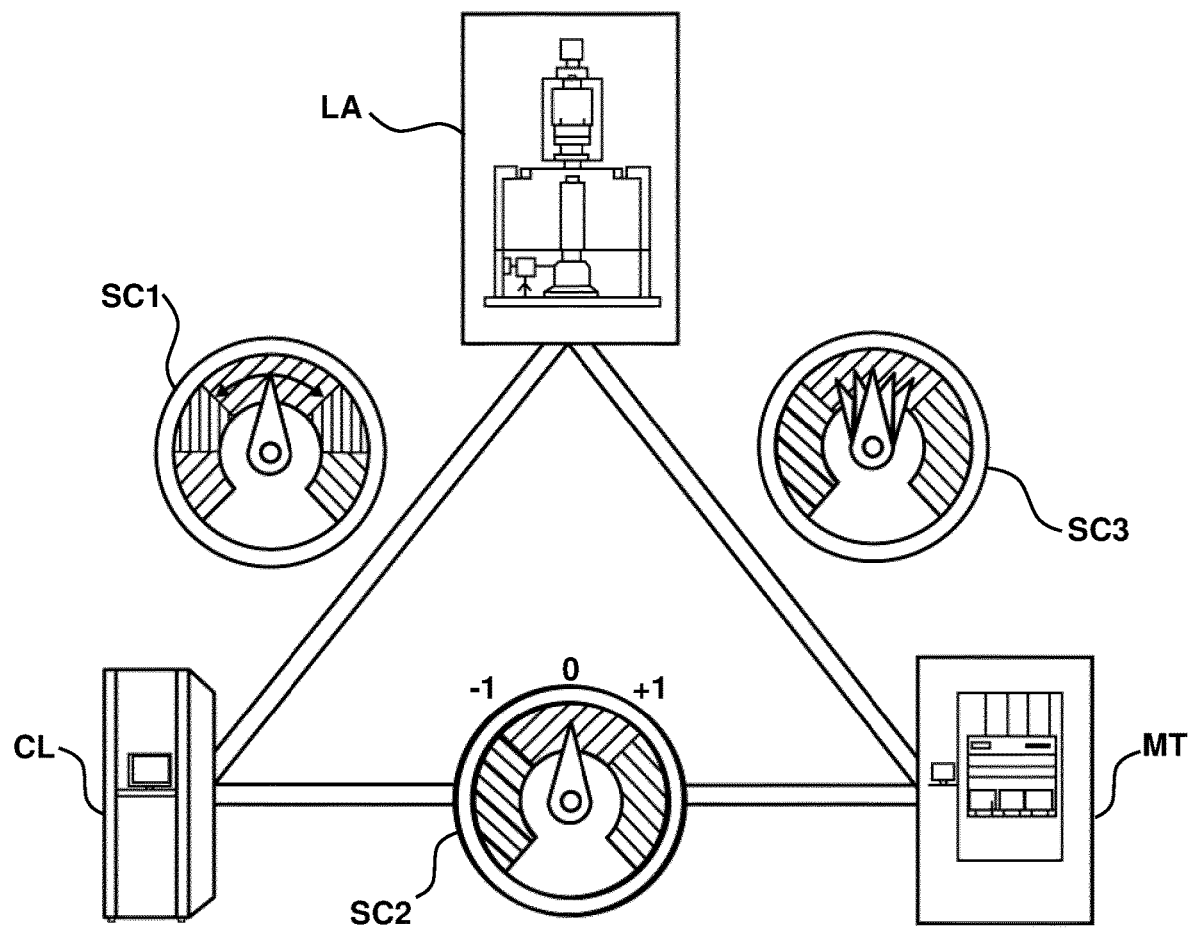
FIG. 3 depicts a schematic representation of holistic lithography, representing a cooperation between three technologies to optimize semiconductor manufacturing, according to an embodiment.

FIG. 3 depicts a schematic representation of holistic lithography, representing a cooperation between three technologies to optimize semiconductor manufacturing. Typically, the patterning process in a lithographic apparatus LA is one of the most critical steps in the processing which requires high accuracy of dimensioning and placement of structures on the substrate W (FIG. 1). To ensure this high accuracy, three systems (in this example) may be combined in a so called "holistic" control environment as schematically depicted in FIG. 3. One of these systems is the lithographic apparatus LA which is (virtually) connected to a metrology apparatus (e.g., a metrology tool) MT (a second system), and to a computer system CL (a third system). A "holistic" environment may be configured to optimize the cooperation between these three systems to enhance the overall process window and provide tight control loops to ensure that the patterning performed by the lithographic apparatus LA stays within a process window. The process window defines a range of process parameters (e.g. dose, focus, overlay) within which a specific manufacturing process yields a defined result (e.g. a functional semiconductor device)—typically within which the process parameters in the lithographic process or patterning process are allowed to vary.

The computer system CL may use (part of) the design layout to be patterned to predict which resolution enhancement techniques to use and to perform computational lithography simulations and calculations to determine which mask layout and lithographic apparatus settings achieve the largest overall process window of the patterning process (depicted in FIG. 3 by the double arrow in the first scale SC1). Typically, the resolution enhancement techniques are arranged to match the patterning possibilities of the lithographic apparatus LA. The computer system CL may also be used to detect where within the process window the lithographic apparatus LA is currently operating (e.g. using input from the metrology tool MT) to predict whether defects may be present due to e.g. sub-optimal processing (depicted in FIG. 3 by the arrow pointing "0" in the second scale SC2).

The metrology apparatus (tool) MT may provide input to the computer system CL to enable accurate simulations and predictions, and may provide feedback to the lithographic apparatus LA to identify possible drifts, e.g. in a calibration status of the lithographic apparatus LA (depicted in FIG. 3 by the multiple arrows in the third scale SC3).

In lithographic processes, it is desirable to make frequent measurements of the structures created, e.g., for process control and verification. Tools to make such measurements include metrology tool (apparatus) MT. Different types of metrology tools MT for making such measurements are known, including scanning electron microscopes or various forms of scatterometer metrology tools MT. Scatterometers are versatile instruments which allow measurements of the parameters of a lithographic process by having a sensor in the pupil or a conjugate plane with the pupil of the objective of the scatterometer, measurements usually referred as pupil based measurements, or by having the sensor in the image plane or a plane conjugate with the image plane, in which case the measurements are usually referred as image or field based measurements. Such scatterometers and the associated measurement techniques are further described in patent applications US20100328655, US2011102753A1, US20120044470A, US20110249244, US20110026032 or EP1,628,164A, incorporated herein by reference in their entirety. Aforementioned scatterometers may measure features of a substrate such as gratings using light from soft x-ray and visible to near-IR wavelength range, for example.

In some embodiments, a scatterometer MT is an angular resolved scatterometer. In these embodiments, scatterometer reconstruction methods may be applied to the measured signal to reconstruct or calculate properties of a grating and/or other features in a substrate. Such reconstruction may, for example, result from simulating interaction of scattered radiation with a mathematical model of the target structure and comparing the simulation results with those of a measurement. Parameters of the mathematical model are adjusted until the simulated interaction produces a diffraction pattern similar to that observed from the real target.

In some embodiments, scatterometer MT is a spectroscopic scatterometer MT. In these embodiments, spectroscopic scatterometer MT may be configured such that the radiation emitted by a radiation source is directed onto target features of a substrate and the reflected or scattered radiation from the target is directed to a spectrometer detector, which measures a spectrum (i.e. a measurement of intensity as a function of wavelength) of the specular reflected radiation. From this data, the structure or profile of the target giving rise to the detected spectrum may be reconstructed, e.g. by Rigorous Coupled Wave Analysis and non-linear regression or by comparison with a library of simulated spectra.

In some embodiments, scatterometer MT is a ellipsometric scatterometer. The ellipsometric scatterometer allows for determining parameters of a lithographic process by measuring scattered radiation for each polarization states. Such a metrology apparatus (MT) emits polarized light (such as linear, circular, or elliptic) by using, for example, appropriate polarization filters in the illumination section of the metrology apparatus. A source suitable for the metrology apparatus may provide polarized radiation as well. Various embodiments of existing ellipsometric scatterometers are described in U.S. patent application Ser. Nos. 11/451,599, 11/708,678, 12/256,780, 12/486,449, 12/920,968, 12/922, 587, 13/000,229, 13/033,135, 13/533,110 and 13/891,410 incorporated herein by reference in their entirety.

In some embodiments, scatterometer MT is adapted to measure the overlay of two misaligned gratings or periodic structures (and/or other target features of a substrate) by measuring asymmetry in the reflected spectrum and/or the detection configuration, the asymmetry being related to the extent of the overlay. The two (typically overlapping) grating structures may be applied in two different layers (not necessarily consecutive layers), and may be formed substantially at the same position on the wafer. The scatterometer may have a symmetrical detection configuration as described e.g. in patent application EP1,628,164A, such that any asymmetry is clearly distinguishable. This provides a way to measure misalignment in gratings. Further examples for measuring overlay may be found in PCT patent application publication no. WO 2011/012624 or US patent application US 20160161863, incorporated herein by reference in their entirety.

Other parameters of interest may be focus and dose. Focus and dose may be determined simultaneously by scatterometry (or alternatively by scanning electron microscopy) as described in US patent application US2011-0249244, incorporated herein by reference in its entirety. A single structure (e.g., feature in a substrate) may be used which has a unique combination of critical dimension and sidewall angle measurements for each point in a focus energy matrix (FEM—also referred to as Focus Exposure Matrix). If these unique combinations of critical dimension and sidewall angle are available, the focus and dose values may be uniquely determined from these measurements.

A metrology target may be an ensemble of composite gratings and/or other features in a substrate, formed by a lithographic process, commonly in resist, but also after etch processes, for example. Typically the pitch and line-width of the structures in the gratings depend on the measurement optics (in particular the NA of the optics) to be able to capture diffraction orders coming from the metrology targets. A diffracted signal may be used to determine shifts between two layers (also referred to 'overlay') or may be used to reconstruct at least part of the original grating as produced by the lithographic process. This reconstruction may be used to provide guidance of the quality of the lithographic process and may be used to control at least part of the lithographic process. Targets may have smaller sub-segmentation which are configured to mimic dimensions of the functional part of the design layout in a target. Due to this sub-segmentation, the targets will behave more similar to the functional part of the design layout such that the overall process parameter measurements resemble the functional part of the design layout. The targets may be measured in an underfilled mode or in an overfilled mode. In the underfilled mode, the measurement beam generates a spot that is smaller than the overall target. In the overfilled mode, the measurement beam generates a spot that is larger than the overall target. In such overfilled mode, it may also be possible to measure different targets simultaneously, thus determining different processing parameters at the same time.

Overall measurement quality of a lithographic parameter using a specific target is at least partially determined by the measurement recipe used to measure this lithographic parameter. The term "substrate measurement recipe" may include one or more parameters of the measurement itself, one or more parameters of the one or more patterns measured, or both. For example, if the measurement used in a substrate measurement recipe is a diffraction-based optical measurement, one or more of the parameters of the measurement may include the wavelength of the radiation, the polarization of the radiation, the incident angle of radiation relative to the substrate, the orientation of radiation relative to a pattern on the substrate, etc. One of the criteria to select a measurement recipe may, for example, be a sensitivity of one of the measurement parameters to processing variations. More examples are described in US patent application US2016-0161863 and published US patent application US 2016/0370717A1 incorporated herein by reference in its entirety.

Figure 4:
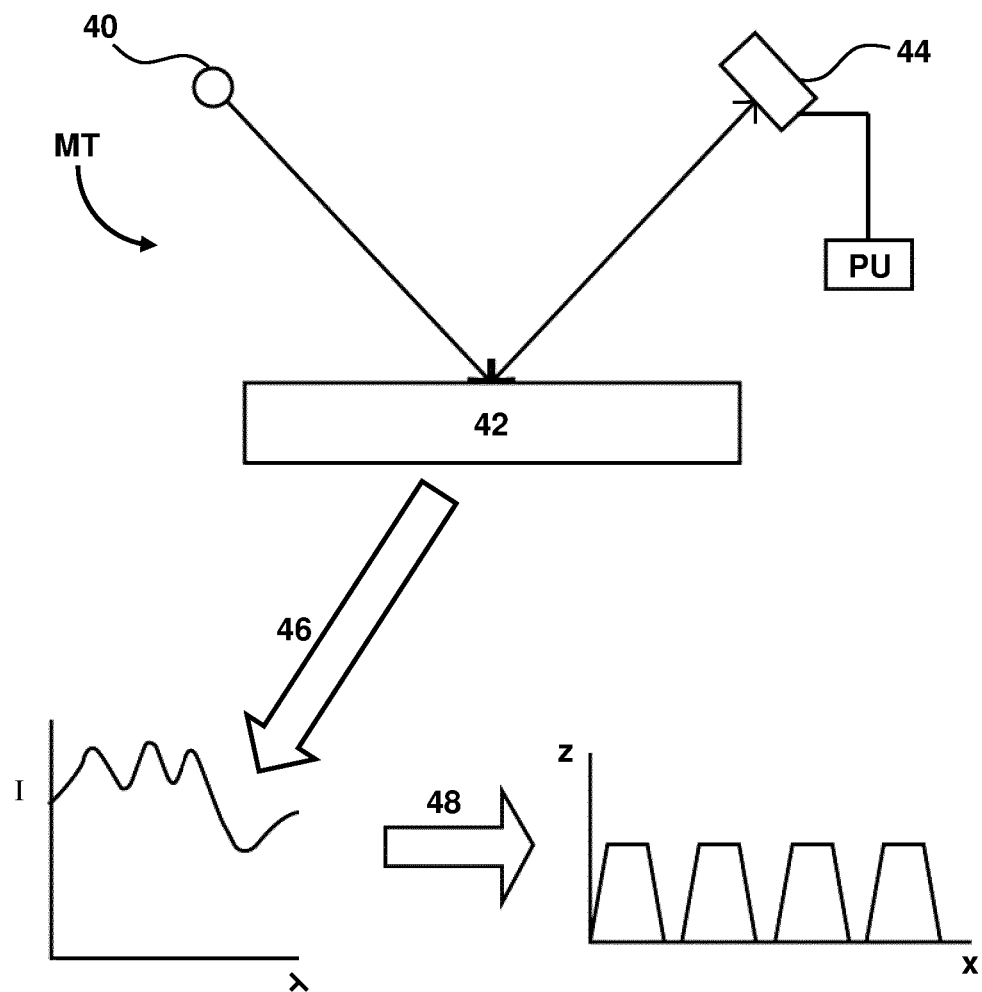
FIG. 4 illustrates an example metrology apparatus, such as a scatterometer, according to an embodiment.

FIG. 4 illustrates an example metrology apparatus (tool) MT, such as a scatterometer. MT comprises a broadband (white light) radiation projector 40 which projects radiation onto a substrate 42. The reflected or scattered radiation is passed to a spectrometer detector 44, which measures a spectrum 46 (i.e. a measurement of intensity as a function of wavelength) of the specular reflected radiation. From this data, the structure or profile giving rise to the detected spectrum may be reconstructed 48 by processing unit PU, e.g. by Rigorous Coupled Wave Analysis and non-linear regression or by comparison with a library of simulated spectra as shown at the bottom of FIG. 3. In general, for the reconstruction, the general form of the structure is known and some parameters are assumed from knowledge of the process by which the structure was made, leaving only a few parameters of the structure to be determined from the scatterometry data. Such a scatterometer may be configured as a normal-incidence scatterometer or an oblique-incidence scatterometer, for example.

It is often desirable to be able computationally determine how a patterning process would produce a desired pattern on a substrate. Computational determination may comprise simulation and/or modeling, for example. Models and/or simulations may be provided for one or more parts of the manufacturing process. For example, it is desirable to be able to simulate the lithography process of transferring the patterning device pattern onto a resist layer of a substrate as well as the yielded pattern in that resist layer after development of the resist, simulate metrology operations such as the determination of overlay, and/or perform other simulations. The objective of a simulation may be to accurately predict, for example, metrology metrics (e.g., overlay, a critical dimension, a reconstruction of a three dimensional profile of features of a substrate, a dose or focus of a lithography apparatus at a moment when the features of the substrate were printed with the lithography apparatus, etc), manufacturing process parameters (e.g., edge placements, aerial image intensity slopes, sub resolution assist features (SRAF), etc.), and/or other information which can then be used to determine whether an intended or target design has been achieved. The intended design is generally defined as a pre-optical proximity correction design layout which can be provided in a standardized digital file format such as GDSII, OASIS or another file format.

Simulation and/or modeling can be used to determine one or more metrology metrics (e.g., performing overlay and/or other metrology measurements), configure one or more features of the patterning device pattern (e.g., performing optical proximity correction), configure one or more features of the illumination (e.g., changing one or more characteristics of a spatial/angular intensity distribution of the illumination, such as change a shape), configure one or more features of the projection optics (e.g., numerical aperture, etc.), and/or for other purposes. Such determination and/or configuration can be generally referred to as mask optimization, source optimization, and/or projection optimization, for example. Such optimizations can be performed on their own, or combined in different combinations. One such example is source-mask optimization (SMO), which involves the configuring of one or more features of the patterning device pattern together with one or more features of the illumination. The optimizations may use the parameterized model described herein to predict values of various parameters (including images, etc.), for example.

In some embodiments, an optimization process of a system may be represented as a cost function. The optimization process may comprise finding a set of parameters (design variables, process variables, etc.) of the system that minimizes the cost function. The cost function can have any suitable form depending on the goal of the optimization. For example, the cost function can be weighted root mean square (RMS) of deviations of certain characteristics (evaluation points) of the system with respect to the intended values (e.g., ideal values) of these characteristics. The cost function can also be the maximum of these deviations (i.e., worst deviation). The term "evaluation points" should be interpreted broadly to include any characteristics of the system or fabrication method. The design and/or process variables of the system can be confined to finite ranges and/or be interdependent due to practicalities of implementations of the system and/or method. In the case of a lithographic projection apparatus, the constraints are often associated with physical properties and characteristics of the hardware such as tunable ranges, and/or patterning device manufacturability design rules. The evaluation points can include physical points on a resist image on a substrate, as well as non-physical characteristics such as dose and focus, for example.

In some embodiments, the present system(s) and method(s) may include an empirical model that performs one or more of the operations described herein. The empirical model may predict outputs based on correlations between various inputs (e.g., one or more characteristics of a complex electric field image, one or more characteristics of a design layout, one or more characteristics of the patterning device, one or more characteristics of the illumination used in the lithographic process such as the wavelength, etc.).

As an example, the empirical model may be a parameterized model and/or other models. The parameterized model may be a machine learning model and/or any other parameterized model. In some embodiments, the machine learning model (for example) may be and/or include mathematical equations, algorithms, plots, charts, networks (e.g., neural networks), and/or other tools and machine learning model components. For example, the machine learning model may be and/or include one or more neural networks having an input layer, an output layer, and one or more intermediate or hidden layers. In some embodiments, the one or more neural networks may be and/or include deep neural networks (e.g., neural networks that have one or more intermediate or hidden layers between the input and output layers).

As an example, the one or more neural networks may be based on a large collection of neural units (or artificial neurons). The one or more neural networks may loosely mimic the manner in which a biological brain works (e.g., via large clusters of biological neurons connected by axons). Each neural unit of a neural network may be connected with many other neural units of the neural network. Such connections can be enforcing or inhibitory in their effect on the activation state of connected neural units. In some embodiments, each individual neural unit may have a summation function that combines the values of all its inputs together. In some embodiments, each connection (or the neural unit itself) may have a threshold function such that a signal must surpass the threshold before it is allowed to propagate to other neural units. These neural network systems may be self-learning and trained, rather than explicitly programmed, and can perform significantly better in certain areas of problem solving, as compared to traditional computer programs. In some embodiments, the one or more neural networks may include multiple layers (e.g., where a signal path traverses from front layers to back layers). In some embodiments, back propagation techniques may be utilized by the neural networks, where forward stimulation is used to reset weights on the "front" neural units. In some embodiments, stimulation and inhibition for the one or more neural networks may be freer flowing, with connections interacting in a more chaotic and complex fashion. In some embodiments, the intermediate layers of the one or more neural networks include one or more convolutional layers, one or more recurrent layers, and/or other layers.

The one or more neural networks may be trained (i.e., whose parameters are determined) using a set of training data (e.g., ground truths). The training data may include a set of training samples. Each sample may be a pair comprising an input object (typically an image, a measurement, a tensor or vector which may be called a feature tensor or vector) and a desired output value (also called the supervisory signal). A training algorithm analyzes the training data and adjusts the behavior of the neural network by adjusting the parameters (e.g., weights of one or more layers) of the neural network based on the training data. For example, given a set of N training samples of the form $\{(x_1, y_1), (x_2, y_2), \ldots, (x_N, y_N)\}$ such that $x_i$ is the feature tensor/vector of the i-th example and $y_i$ is its supervisory signal, a training algorithm seeks a neural network g: X→Y, where X is the input space and Y is the output space. A feature tensor/vector is an n-dimensional tensor/vector of numerical features that represent some object (e.g., a complex electric field image). The tensor/vector space associated with these vectors is often called the feature or latent space. After training, the neural network may be used for making predictions using new samples.

As described herein, the present method(s) and system(s) include a parameterized model (e.g., a machine learning model such as a neural network) that uses a variational encoder-decoder architecture. In the middle (e.g., middle layers) of the model (e.g., a neural network), the present model formulates a low-dimensional encoding (e.g., latent space) that encapsulates information in an input (e.g., a complex electric field image and/or other input associated with a pattern or other features of a semiconductor manufacturing process) to the model. The present system(s) and method(s) leverage the low dimensionality and compactness of the latent space to make determinations directly in the latent space.

Figure 5:
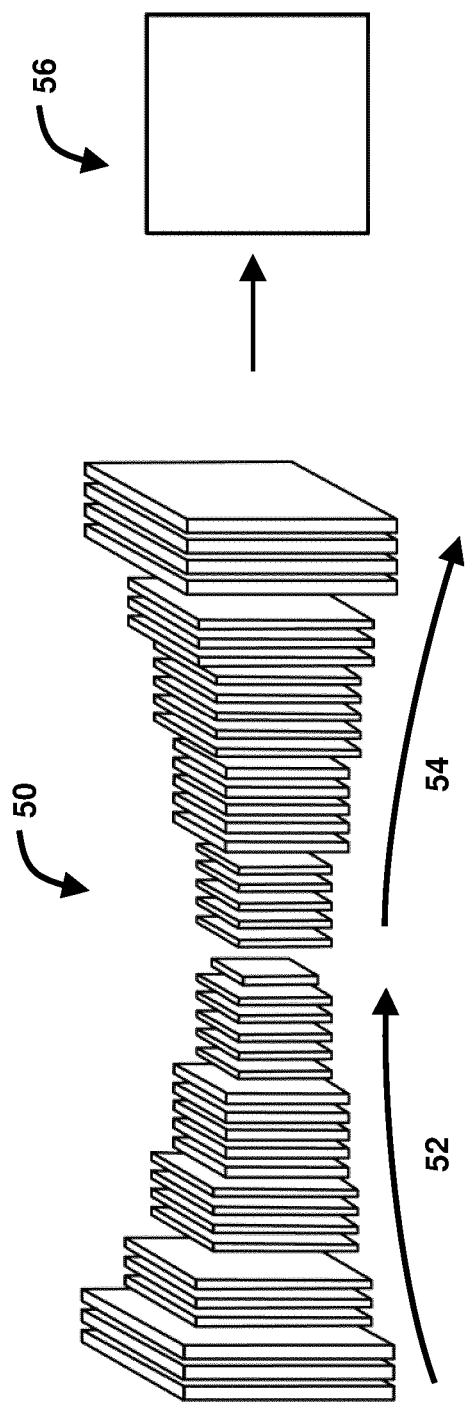
FIG. 5 illustrates encoder-decoder architecture, according to an embodiment.

By way of a non-limiting example, FIG. 5 illustrates (variational) encoder-decoder architecture 50. Encoder-decoder architecture 50 has an encoding portion 52 (an encoder) and a decoding portion 54 (a decoder). In the example shown in FIG. 5, encoder-decoder architecture 50 may output predicted complex electric field images 56.

Figure 6:
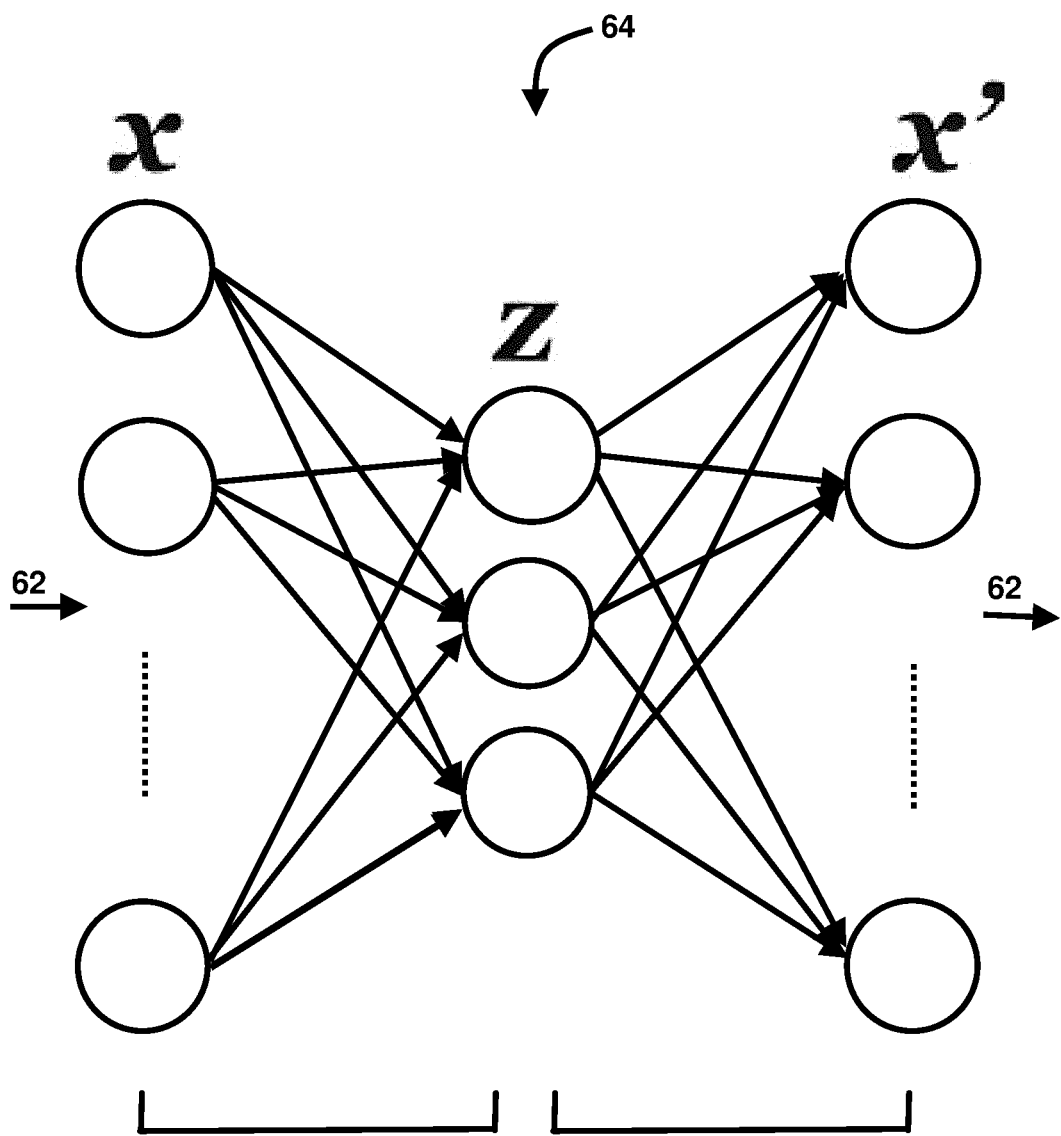
FIG. 6 illustrates encoder-decoder architecture within a neural network, according to an embodiment.

By way of another non-limiting example, FIG. 6 illustrates encoder-decoder architecture 50 within a neural network 62. Encoder-decoder architecture 50 includes encoding portion 52 and decoding portion 54. In FIG. 6, x represents encoder input (e.g., an input complex electric field image and/or extracted features of the input complex electric field image) and x' represents decoder output (e.g., a predicted output image and/or predicted features of an output image). In some embodiments, x' may represent an output from an intermediate layer of neural network (in comparison to a final output of the overall model), for example, and/or other outputs. In FIG. 6, z represents the latent space 64 and/or a low dimensional encoding (tensor/vector). In some embodiments, z is or is related to a latent variable.

In some embodiments, the low dimensional encoding z represents one or more features of an input (e.g., a complex electric field image). The one or more features of the input may be considered key or critical features of the input.

Features may be considered key or critical features of an input because they are relatively more predictive than other features of a desired output and/or have other characteristics, for example. The one or more features (dimensions) represented in the low dimensional encoding may be predetermined (e.g., by a programmer at the creation of the present machine learning model), determined by prior layers of the neural network, adjusted by a user via a user interface associated with a system described herein, and/or may be determined in by other methods. In some embodiments, a quantity of features (dimensions) represented by the low dimensional encoding may be predetermined (e.g., by the programmer at the creation of the present machine learning model), determined based on output from prior layers of the neural network, adjusted by the user via the user interface associated with a system described herein, and/or determined by other methods.

It should be noted that even though a machine learning model, a neural network, and/or encoder-decoder architecture are mentioned throughout this specification, a machine learning model, a neural network, and encoder-decoder architecture are just examples, and the operations described herein may be applied to different parameterized models.

As described above, process information (e.g., images, measurements, process parameters, metrology metrics, etc.) may be used to guide various manufacturing operations. Utilizing the relatively lower dimensionality of a latent space to predict and/or otherwise determine the process information may be faster, more efficient, require fewer computing resources, and/or have other advantages over prior methods for determining process information.

The low dimensional latent space can be used advantageously for prediction of complex electric filed images, for example. Prediction of complex electric field images requires determination and/or prediction of a phase associated with a complex electric field image based on a corresponding amplitude measurement. Typical phase retrieval comprises recovering a complex (valued) electric field $x \in C^n$ from corresponding amplitude (e.g., intensity) measurements, y, (e.g., for a particular target) according to the equation:

$$y = |Ax| + \epsilon \quad (1)$$

where $y \in R^m$ is a measurement vector, $A \in C^{m \times n}$ is a measurement matrix, $\epsilon \in R^m$ is the measurement noise (with E representing the noise), x is the complex-valued electric field at a camera level that is perfectly in focus, A is a defocus operator that propagates the in-focus electric field to out-of-focus electric fields (as a consequence of introducing measurement diversity by moving the camera along z), y is the collection of amplitude measurements (e.g., the modulus of the electric fields at the camera for various de-focus positions (potentially polluted with random noise $\epsilon$)), m is a size of the measured signal, and n is the size of the retrieved complex-valued electric field. As an example: n may be a number of pixels for a camera (assuming one wants to retrieve the electric field for all pixels and not a subset), and m=K*n where K is a positive integer corresponding to a number of (through-focus) measurements (i.e. the number of different acquisitions one takes with the camera).

Phase retrieval is difficult due to a large number of unknowns (e.g., on the order of $10^6$), nonlinearity, and non-convexity associated with the complex electric field (which combine to make phase retrieval a highly dimensional problem). Existing approaches for phase retrieval include introducing redundancy in the amplitude measurements (e.g., taking more amplitude measurements than dimensions of a true signal for x, such that m>n, usually in the form of an oversampled Fourier transform, short-time Fourier transform, random Gaussian measurements, coded diffraction patterns using random masks or structured illuminations, wavelet transform, and/or Gabor frames), or exploiting prior knowledge about the complex electric field image (e.g., exploiting knowledge about the true signal x (prior information) such as sparsity, gradient sparsity (total variation), smoothness, compactness, non-negativity, etc.) to reduce the number of unknowns).

Figure 7:
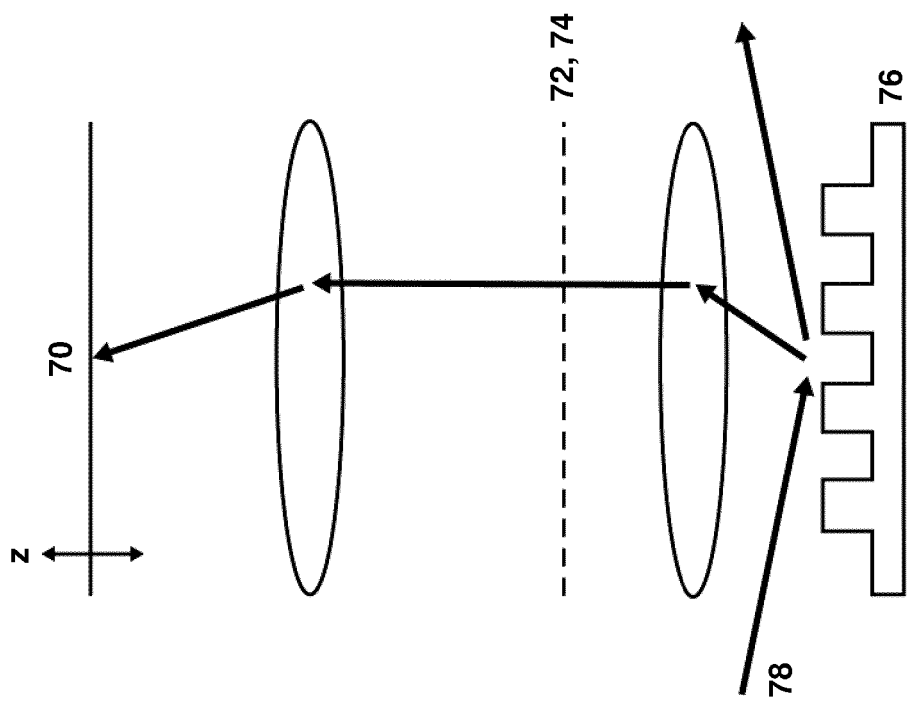
FIG. 7 illustrates an example camera associated with obtaining complex electric field images, according to an embodiment.

As an example, phase retrieval is used to retrieve the aberrated complex-valued electric field at a camera (e.g., a sensor used to acquire an electric field image). FIG. 7 illustrates an example camera 70 associated with obtaining complex electric field images (e.g., variables x, y, and A described above are related to camera 70). FIG. 7 also illustrates a pupil 72 (and associated aberrations 74), a target 76, and illumination 78. Having access to the full field (both amplitude and phase) allows one to computationally remove aberrations 74 associated with a corresponding sensor (e.g., camera 70) via a back-transform to pupil 72, dividing out aberrations 74 (obtained from a separate calibration step), followed by a forward transform to camera 70. The cleaned up image at camera 70 allows for a more robust overlay, and/or other metrology parameter, determination.

These and other prior approaches require redundant data, making assumptions, are computationally intensive, and/or have other disadvantages. Redundant measurements lead to a decrease in throughput. Manual incorporation of assumptions and/or other prior information into the phase retrieval problem introduces a bias as it is not directly determined by the data. Also a computational cost of goods is high since the dimensionality of x is large, making the iterative phase retrieval operations very time consuming.

Advantageously, the present system(s) and method(s) solve the phase retrieval problem using the parameterized model(s) described herein. The parameterized model is configured for predicting electric field images, predicting metrology metrics (e.g., instead of or in addition to the metrology apparatuses described above), and/or predicting other information. The parameterized model is configured to significantly reduce the dimensionality of the phase retrieval problem, which can then be solved using a simple gradient-based optimization scheme in few dimensions, and/or using other methods.

Figure 8:
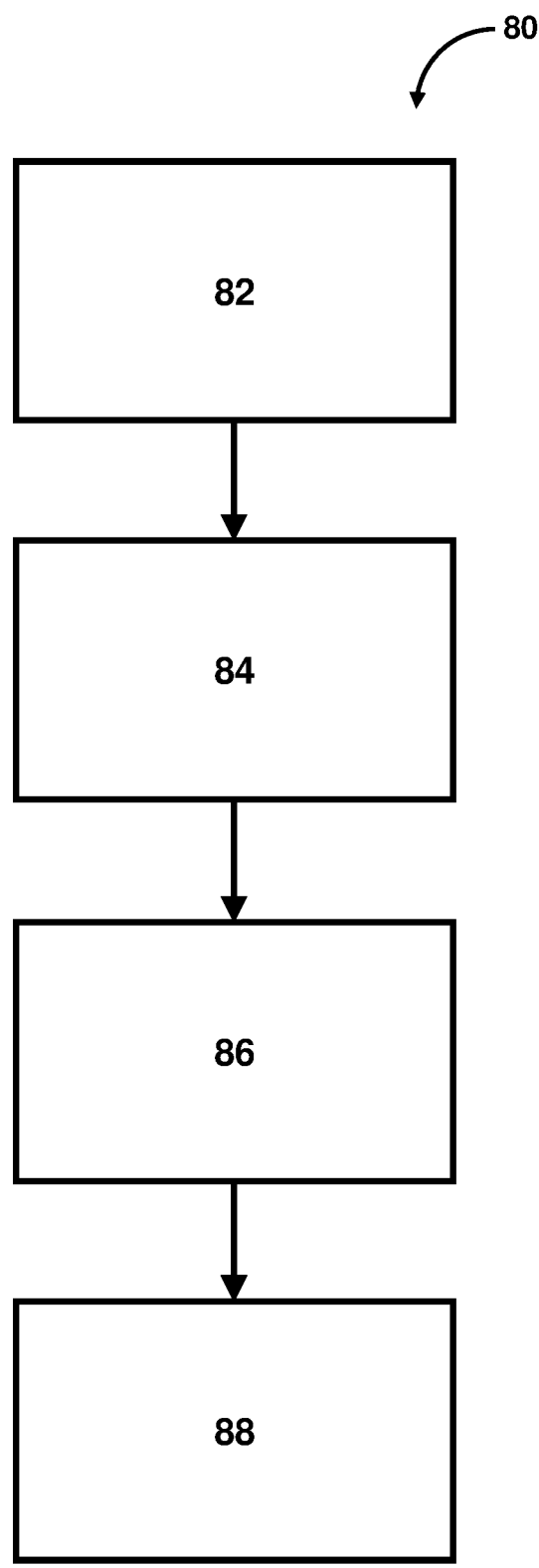
FIG. 8 illustrates a summary of operations of a present method for predicting electric field images with a parameterized model, according to an embodiment.

FIG. 8 illustrates a summary method 80 of operations of a present method for predicting electric field images with a parameterized model. At an operation 82, the parameterized model is trained. At an operation 84, a latent space representation of an electric field image is determined for a given input. At an operation 86, the electric field image is predicted with a parameterized model. At an operation 88, one or more metrology metrics are determined based on the latent space representation of the electric field image, the predicted electric field image, and/or other information. The operations of method 80 presented below are intended to be illustrative. In some embodiments, method 80 may be accomplished with one or more additional operations not described, and/or without one or more of the operations discussed. For example, method 80 may not require determining one or more metrology metrics. Additionally, the order in which the operations of method 80 are illustrated in FIG. 8 and described below is not intended to be limiting. In some embodiments, one or more portions of method 80 may be implemented (e.g., by simulation, modeling, etc.) in one or more processing devices (e.g., one or more processors). The one or more processing devices may include one or more devices executing some or all of the operations of method 80 in response to instructions stored electronically on an electronic storage medium. The one or more processing devices may include one or more devices configured through hardware, firmware, and/or software to be specifically designed for execution of one or more of the operations of method 80, for example.

At an operation 82, the parameterized model is trained. The parameterized model may be a machine learning model comprising a neural network, encoder-decoder architecture, and/or other components. The encoder-decoder architecture may be variational encoder-decoder architecture and/or other architecture. In some embodiments, the parameterized model may be a variational deep neural network (DNN) that includes an encoder, a decoder, and/or other components. In some embodiments, this or similar structures for the parameterized model facilitate the inclusion of uncertainties in predictions from the parameterized model and/or has other advantages. For example, since the parameterized model is variational (as described herein), the parameterized model is able to output multiple prediction realizations for a single input. This in turn means that an uncertainty metric can be determined for those realizations, for example by calculating the standard deviation of those realizations.

Operation 82 comprises training the variational encoder-decoder architecture with a probabilistic latent space, which generates realizations in an output space. In some embodiments, the latent space comprises low dimensional encodings (e.g., as described above). The parameterized model is trained with existing data (e.g., measured and/or simulated complex field images having an amplitude and a phase, corresponding metrology metrics, etc.) and/or other information. In some embodiments, the parameterized model may model (or model the functionality of) one or more of the pupil, the aberrations, the target, or the illumination shown in FIG. 7, for example.

When the parameterized model is trained, the latent space forms a compressed, continuous representation of encoded images (for example), which facilitates performance of various operations in the latent space. Advantageously, the latent space is low dimensional (e.g., compared to the image space). The various operations may include determination of latent space representations of complex electric field images (as described below), and/or other operations, for example. This may be computationally less expensive to perform in the latent space compared to the image space, due at least to the low dimensional value of the latent space (relative to the image space), for example.

In some embodiments, the dimensional data in the latent space is encoded by the encoder of the encoder-decoder architecture. In some embodiments, predictions, and/or other output from the parameterized model are generated by the decoder of the encoder-decoder architecture. As described herein, the encoder comprises a portion of the parameterized model configured to transform model inputs into the dimensional data in the latent space, and the decoder comprises a different portion of the parameterized model configured to transform the dimensional data in the latent space into the output realizations. Transforming may include, for example, encoding, decoding, projecting, mapping, etc. By way of a non-limiting practical example, in some embodiments, model inputs may be complex electric field images and/or other information associated with a semiconductor device manufacturing process. The dimensional data in the latent space may comprise multi-dimensional tensors and/or vectors associated with model inputs. The output realizations may comprise predicted complex electric field images, metrology metrics, and/or other information. In some embodiments, the predicting comprises decoding, with one or more layers and/or one or more nodes of a neural network, a multi-dimensional tensor and/or vector of the dimensional data into an output realization.

The parameterized model is trained with (known—e.g., measured and/or modeled) electric field images, corresponding amplitude measurements, metrology metrics, and/or other information. The electric field images and corresponding amplitude measurements and/or metrology metrics may form input object/output value training pairs, for example (as described herein). The electric field images may be complex electric field images and/or other electric field images. A complex electric field image may include an amplitude, a phase, and/or other information. The amplitude may be the absolute value of the complex-valued electric field, for example. The amplitude may comprise an image intensity for example, and or other parameters that are a function of the amplitude. The phase may comprise the angle of the complex-valued electric field vector in the complex plane, for example. As such, the parameterized model is trained with corresponding amplitude and/or phase information for the electric field images, and/or other information.

In some embodiments, operation 82 comprises training the parameterized model with a training set of complex electric field images. In some embodiments, the set of complex electric field images is generated during a through focus measurement and/or generated in other ways. For example, in some embodiments, the set of complex electric field images is generated by adjusting the position of the camera (e.g., camera 70 shown in FIG. 7) obtaining the images up and/or down in a "z" direction (e.g., as shown in FIG. 7).

In some embodiments, operation 82 comprises encoding, with the encoder, higher dimensional data associated with the electric field images into the dimensional data in the latent space. In some embodiments, operation 82 comprises encoding the complex electric field images, the measured amplitudes, the metrology metrics, and/or other information in the training set into the dimensional data in the latent space, and transforming the dimensional data in the latent space into recovered versions of the complex electric field images in the training set, predicting metrology metrics, and/or performing other operations to facilitate verification of the training.

In some embodiments, operation 82 comprises iteratively providing additional complex electric field images as input to the parameterized model. The additional complex electric field images are determined based on an extent to which the recovered versions of the complex electric field images match the complex electric field images in the training set. For example, during training, if a recovered (or predicted) complex electric field image matches a corresponding input image, fewer or no additional complex electric field images may need to be provided for training Conversely, if a recovered (or predicted) complex electric field image does not match, or poorly matches a corresponding input image, several additional complex electric field images may need to be provided for training. This process may be repeated any number of times until the parameterized model is sufficiently trained.

Figure 9:
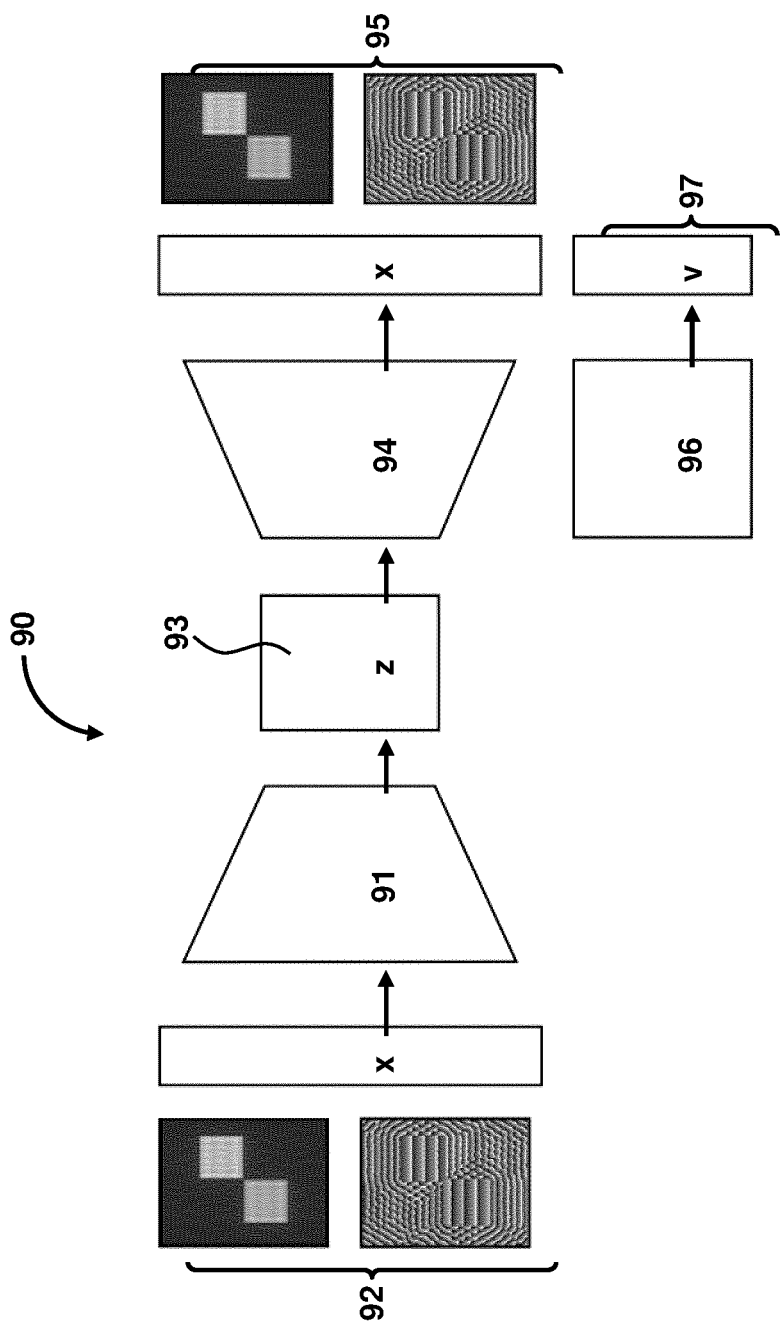
FIG. 9 illustrates an example of a parameterized model, according to an embodiment.

FIG. 9 illustrates an example of a parameterized model 90. Parameterized model 90 may be a variational autoencoder, for example. Parameterized model 90 uses an encoder or encoder network 91 to encode inputs (x) 92 (e.g., complex electric field images with amplitude and phase, measured amplitudes, metrology metrics, and/or other inputs) into a continuous representation, also called latent space (z) 93, and a decoder or decoder network 94 to generate a corresponding output (x') 95 (predicted images having a predicted amplitude and phase, and/or other outputs such as predicted metrology metrics). For example, encoder or encoder network 91 (E(x)) may be configured to convert an input image $x \in C^n$ into a lower-dimensional, real-valued continuous latent vector $z \in R^k$ (k<<n). C may represent the space of complex-valued numbers, R may represent the space of real-valued numbers, k may represent the dimension of the latent space, and n may represent the dimension of the input space. Encoder or encoder network 91 may also model the uncertainty of this latent vector. Decoder or decoder network 94 D(z) may be configured to convert the continuous latent vector back into a copy of the input image x'.

As shown in FIG. 9, in some embodiments, parameterized model 90 includes a portion 96 configured to determine one or more metrology metrics (v) 97 (this is further described below). Training of both networks 91, 94, and portion 96, is performed using input object/output value pairs (e.g., the electric field images and corresponding amplitude measurements and/or metrology metrics as described above).

Parameterized model 90 learns to encode complex electric field images x in a low dimensional latent space. Given a low-dimensional input vector z, in the latent space, decoder or decoder network 94 is able to generate new samples D(z). The variational nature of parameterized model 90 enables the prediction of uncertainties, which in turn can be used for uncertainty guided training (active learning). This may include providing more training examples of complex electric field images to parameterized model 90 that generate large uncertainty. In some embodiments, a loss function for training parameterized model 90 can be a classical (L1, L2, etc.) norm or a similarity metric that is learned directly from the data using a discriminator network, for example.

In some embodiments, parameterized model 90 may be fully trained. In these embodiments, operation 82 may be configured to improve parameterized model 90 by training parameterized model 90 with new and/or otherwise different input object/output value pairs. In some embodiments, parameterized model 90 may be partially trained or not trained. In these embodiments, operation 82 may facilitate at least partial training of parameterized model 90 including forming latent space 93.

Returning to FIG. 8, at an operation 84, a latent space representation of an (e.g., complex) electric field image is determined for a given input to the parameterized model. The given input comprises a measured amplitude associated with the electric field image, and/or other information. The latent space representation of the electric field image comprises a continuous latent tensor, vector, and/or other latent space representations. The latent space representation is determined based on dimensional data in the latent space of the parameterized model, and/or other information. In some embodiments, determining the latent space representation of the electric field image comprises minimizing a function constrained by a set of electric field images that could be predicted by the parameterized model based on the dimensional data in the latent space and the given input.

For example, to eventually predict a complex electric field image (which includes both amplitude and phase), from amplitude only measurements, y, determining the latent space representation of the electric field image comprises minimizing the following objective function:

$$x^* = \underset{x \in Range(D)}{\operatorname{argmin}} \||y - |Ax|\||^2 \quad (2)$$

where Range (D) is the set of potential images that can be generated by a pre-trained decoder D. It should be noted that x' (described above) represents any predicted image, and x* is the particular image that minimizes the norm in equation (2), i.e. the image containing the amplitude and phase that one is trying to retrieve. The minimization problem above can be equivalently formulated in the lower dimensional latent space representation as follows:

$$z^* = \underset{z \in R^k}{\operatorname{argmin}} \||y - |AD(z)|\||^2 \quad (3)$$

The variable z* is or represents the latent space representation of the electric field image. The continuous representation of the latent space facilitates gradient-based optimization to efficiently guide the search for optimal z*, for example.

At an operation 86, the electric field image is predicted with the parameterized model. The electric field image is predicted based on the latent space representation of the electric field image and/or other information. In some embodiments, predicting the electric field image based on the latent space representation of the electric field image (e.g., operation 86) comprises passing the latent space representation of the electric field image through a decoder of the encoder-decoder architecture.

For example, as shown in FIG. 9, a decoder or decoder network 94 (or a portion of decoder network 94) maps, projects, decodes, or otherwise transforms the low dimensional latent space representation of the electric field image in latent space 93 to output 95. In some embodiments, output 95 is predicted based on the dimensional data in latent space 93, the low dimensional latent space representation of the complex electric field image in latent space 93, and/or other information. Output 95 is a predicted complex electric field image in this example. Put another way, once z* is found, the complex electric field image is predicted by a forward pass of the solution (to z*) through the decoder such that $$x^* = D(z^*). \quad (4)$$

Since the optimization is performed on the lower dimensional latent space variable z, the computational cost of goods is reduced substantially compared to prior methods. Other advantages are contemplated.

Returning to FIG. 8, at operation 88, one or more metrology metrics are determined based on the predicted electric field image, the low dimensional latent space representation of the (complex) electric field image, the dimensional data in the latent space, and/or other information. Determination may include prediction and/or other determinations. For example, in some embodiments, a metrology metric such as overlay may be predicted and/or otherwise determined based on an average of an intensity range of one or more predicted complex electric field images over a region of interest. As another example, in some embodiments, a metrology metric may be predicted and/or otherwise determined based on the latent space representation of the electric field image. In some embodiments, determining the one or more metrology metrics based on the latent space representation of the electric field image comprises providing the latent space representation of the electric field image to a regression network and/or other predictor that is included in or separate from the parameterized model. In some embodiments, other low dimensional data in the latent space may be provided to such a regression network for prediction and/or other determination of the one or more metrology metrics.

For example, as shown in FIG. 9, portion 96 of parameterized model 90 (comprising a regression network R(z) in this example) is configured to determine one or more metrology metrics 97 based on the low-dimensional data in latent space 93. In the example shown in FIG. 9, the one or more metrology metrics comprise overlay (v). The overlay may be determined based on a latent vector in the latent space (e.g., the latent space representation of the complex electric field image) and/or other information. For example, a metrology metric may be predicted and/or otherwise determined by a forward pass of z* through the regression network (e.g., portion 96) such that:

$$v^* = R(z^*). \quad (5)$$

It should be noted that v (described herein) can be any predicted metrology metric (such as overlay), and v* is the particular metrology metric that corresponds to image x*.

As shown in FIG. 9, in some embodiments, parameterized model 90 may be configured such that additional information which is intrinsically embedded in the original signal x (e.g., input 92) can be extracted via an additional step such as, for example, feeding it to a regression network (e.g., portion 96). In this way, metrology information can be extracted simultaneously with phase retrieval. Here, the example metrology metric is overlay, but the method can be extended to any additional scalar parameter (e.g., one or more metrology metrics and/or other metrics) that is embedded in x. In some embodiments, the one or more metrology metrics comprise one or more of overlay, a critical dimension, a reconstruction of a three dimensional profile of features of a substrate, a dose or focus of a lithography apparatus at a moment when the features of the substrate were printed with the lithography apparatus, alignment, and/or other metrology metrics.

By way of a non-limiting practical example, the present systems, methods, apparatus, etc., described herein, may be used for determining one or more metrology metrics (e.g., overlay as described above) for semiconductor manufacturing processes using a parameterized model (e.g., 90 shown in FIG. 9) comprising one or more machine learning algorithms (e.g., encoder network 91, decoder network 94, portion 96, etc. shown in FIG. 9). A feature vector (e.g., low dimensional encoded latent space data) associated with an unknown electric field image may be determined, encoded, and/or otherwise received (e.g., via control circuitry that is part of a computer system such as computer system 100 shown in FIG. 10 described below). As described herein, the feature vector represents values corresponding to a latent space representation of an electric field image (e.g., see latent space 93 in FIG. 9). Using the control circuitry, the feature vector may be input into (e.g., provided to) a machine learning model or a portion of a machine learning model (e.g., decoder network 94 shown in FIG. 9). In some embodiments, the machine learning model may comprise a generative classifier (e.g., a decoder) used to identify a known electric field image based on labeled feature vectors corresponding to latent space representations of electric field images. The known electric field image is a higher dimensional representation of the latent space representation of the electric field image (e.g., as described herein). In some embodiments, again using the control circuitry, a first prediction from the machine learning model is received. The first prediction may indicate whether the first feature vector corresponds to the known electric field image. In response to the first prediction indicating that the first feature vector corresponds to the known electric field image, a recommendation for a metrology metric for a semiconductor manufacturing process corresponding to the known electric field image may be generated for display on a user interface (e.g., see display 112 shown in FIG. 10 and described below). This operation may be performed by portion 96 of parameterized model 90, for example, and/or other components described herein.

Returning to FIG. 8, in some embodiments, a metrology apparatus may perform some or all of operation 88 and/or the other operations described herein. For example, in some embodiments, a metrology apparatus may be configured to determine one or more metrology metrics for a semiconductor manufacturing process. The apparatus may comprise one or more processors configured to: determine, based on dimensional data in a latent space of a parameterized model, a latent space representation of an electric field image for a given input; predict, with the parameterized model, the electric field image based on the latent space representation of the electric field image; and determine the one or more metrology metrics for the semiconductor manufacturing process based on the predicted electric field image. In some embodiments, the metrology apparatus may be included in lithographic cell (e.g., as described herein) or the metrology apparatus may stand alone.

In some embodiments, operation 88 comprises determining, based on one or more predicted electric field images, one or more metrology metrics, and/or other information, adjustments to semiconductor manufacturing process parameters for patterning substrate geometry as part of a semiconductor manufacturing process. In some embodiments, the one or more semiconductor manufacturing process parameters comprise one or more of a mask design, a pupil shape, a dose, a focus, and/or other parameters. In some embodiments, the one or more semiconductor manufacturing process parameters comprise the mask design such that the mask design is changed from a first mask design to a second mask design. Other examples, related to several different aspects of an integrated circuit fabrication process, and/or other processes, are contemplated.

The principles described herein (e.g., utilizing the relatively lower dimensionality of a latent space in a trained parameterized model to predict and/or otherwise determine process information) may have multiple additional applications (e.g., in addition to and/or instead of the complex electric field prediction application shown in FIG. 8 and described above). For example, the present system(s) and method(s) may be used to harmonize data from different process sensors and/or tools that may be different, even for the same measured or imaged target.

The present method(s) and system(s) are configured to determine, in a latent space of a parameterized model (where there are fewer dimensions of data to analyze compared to the number of dimensions in the raw data from the different sensors and/or tools), a latent space representation of a given input to the parameterized model. The latent space representation is transformed, based on a reference latent space representation for the given input, into a transformed latent space representation of the given input; and process information is predicted based on the transformed latent space representation of the given input. For example, the given input may be associated with a target, and received from one of a plurality of different sensors and/or tools configured to generate the given input. The transforming and predicting are configured such that predicted and/or otherwise determined process information (e.g., images, measurements, process parameters, metrology metrics, etc.) from the parameterized model, for the target, is the same, independent of which one of the sensors and/or tools generated the given input.

In some embodiments, the given input is associated with a target, and received from one of a plurality of target characterization apparatuses configured to generate the given input. The target characterization apparatuses may include various sensors and/or tools configured to generate data about a target. The data may include images, values for various metrics, and/or other information. In some embodiments, the given input comprises one or more of an input image, an input process measurement and/or series of process measurements, and/or other information. In some embodiments, the latent space representation may be a tensor, a vector, and/or other latent space representations (e.g., something that has fewer dimensions than the number of dimensions associated with the given input).

In some embodiments, the transforming comprises one or more mathematical operations performed on the latent space representation of the given input. In some embodiments, the transforming is performed in the latent space. The mathematical operations may include translation (e.g., in x, y, z, or other equivalent dimensions in the latent space); a (higher order) polynomial modeling covering all (or a subset of the) dimensions such as scaling, rotation, etc.; and/or other operations.

In some embodiments, the reference latent space representation comprises a weighted combination of previously received inputs to the parameterized model, an average of latent space representations of previously received inputs to the parameterized model, a latent space representation of an input from a specific target characterization apparatus configured to generate the given input, and/or other latent space representations. For example, a user may have a particular sensor and/or other tool that the user thinks consistently provides the most accurate and/or otherwise best data for a target (e.g., a "golden tool"). The reference latent space representation may be an encoding of data (e.g., an image and/or other data) from that sensor and/or other tool.

By way of a non-limiting example, the given input may comprise an image (e.g., any image associated with or generated during semiconductor manufacturing). The image may be encoded by encoder architecture of the parameterized model into a low dimensional vector that represents the image in the latent space. The various dimensions of the vector may be translated within the latent space such that the vector that represents the input image matches the reference latent space representation (as one example—other transformations are possible). The transformed vector may then be decoded into the predicted process information.

In some embodiments, the predicted process information comprises one or more of a predicted image, a predicted process measurement (e.g., a metric value), and/or other information. In some embodiments, the predicted process measurement comprises one or more of a metrology metric, an xyz position, a dimension, an electric field, a wavelength, an illumination and/or detection pupil, a bandwidth, an illumination and/or detection polarization angle, an illumination and/or a detection retardance angle, and/or other process measurements.

In this example, the parameterized model may have variational encoder-decoder architecture with a probabilistic latent space, which generates realizations in an output space. In some embodiments, the latent space comprises low dimensional encodings (e.g., as described above). The parameterized model is trained with existing data (e.g., measured and/or simulated data (e.g., images, values for various metrics, etc.) from different target characterization apparatuses (e.g., sensors, tools, etc.) for the same target, etc.) and/or other information. The training data may include, for example, different data from a wide range of different target characterization apparatuses, but for the same target. As described above, the dimensional data in the latent space is encoded by the encoder of the encoder-decoder architecture. In some embodiments, predictions, and/or other output from the parameterized model are generated by the decoder of the encoder-decoder architecture.

In addition, the training of the parameterized model can be extended for (matching) characterization apparatuses for any type of measurement (field, pupil, position, height, etc.) The training of the parameterized model may also be extended by adding target characterization apparatus constants (e.g., machine constants from calibrations and/or hardware specifications) to the training data. In such embodiments, the latent space transformation may potentially be used to determine root causes for the variation between characterization apparatuses. For example, a systematic offset in positioning (such as an xyz position of a stage and/or optical components) can translate into an overlay error.

As another example, the present method(s) and system(s) may be configured to determine, based on dimensional data in the latent space of a parameterized model (again, where there are fewer dimensions of data to analyze compared to the number of dimensions in raw data from the different experimental iterations), a latent space representation of an optimum set of process parameters associated with a given input to the parameterized model, and predict process information based on the latent space representation of the optimum set of process conditions.

In some embodiments, the given input comprises one or more of a defined design parameter, a defined metrology measurement recipe parameter, and/or other defined information for a target. The defined design parameters and/or the defined metrology measurement recipe parameters may be unchangeable because of design requirements (e.g., a certain size, shape, location, and/or other requirement for one or more features of a target design), machine capability, materials used during the manufacturing process, scientific limitations (e.g., the laws of physics, chemistry, etc.), required relationships between elements of a target design, required steps in a manufacturing recipe, for example, or other input.

In some embodiments, the predicted process information comprises one or more of a design parameter, a metrology measurement recipe parameter, and/or other parameters, for a target. In some embodiments, the design parameter comprises one or more of a critical dimension, a pitch, a segmentation pitch, line geometry, contact geometry, hole geometry, and/or other information associated with the target. In some embodiments, the metrology measurement recipe parameter comprises one or more of a wavelength, a bandwidth, an aperture, an illumination and/or detection pupil, a bandwidth, an illumination and/or detection polarization angle, an illumination and/or a detection retardance angle, a dose, and/or other recipe parameters for measuring the target.

In some embodiments, the optimum set of process parameters define optimum measurement conditions for measuring a metrology metric for a target. The optimum measurement conditions may be the ideal measurement conditions for a given target for the measurement of a specific metrology metric, for example, and/or other measurement conditions.

In some embodiments, the optimum set of process parameters comprise one or more of an intensity, a contrast, an edge response, a diffraction efficiency, an overlay sensitivity, and/or other process parameters. By way of a non-limiting example, each process parameter may have an ideal working range: intensity: in the middle of the measurement camera range; contrast: high contrast with surrounding features; edge response: as low as possible overshoot at edges; diffraction efficiency: as high as possible (but linked to intensity); overlay sensitivity: above a minimum threshold, e.g. absolute sensitivity >0.2 (on a scale of 0-2), and also linked to intensity. Given these constraints, it can be determined how these parameters project back onto the measurement conditions. This will give a probability distribution over the measurement conditions where it matches best with the optimum process parameters.

Put another way, a user may input defined target design or metrology measurement recipe parameters into the parameterized model. The parameterized model may be configured such that there is an optimum set of process parameters defining optimum measurement conditions for the input. The parameterized model may then predict (determine), based on the input, the optimum set of process parameters, and/or other information, one or more (e.g., recommended) design parameters and/or metrology recipe parameters for the input. In other words, the model is configured to output the best possible target design (e.g., parameters that define this best possible target design), and/or best possible measurement settings (e.g., parameters) for a metrology apparatus, given the limitations input into the model by the user (based on what the model has been trained to know about the optimum set of process parameters for that input).

In this example, the parameterized model may have variational encoder-decoder architecture with a probabilistic latent space, which generates realizations in an output space. In some embodiments, the latent space comprises low dimensional encodings (e.g., as described above). The parameterized model is trained with existing data (e.g., measured and/or simulated target designs, corresponding known measurement conditions and/or metrology metrics, etc.) and/or other information. As described above, the dimensional data in the latent space is encoded by the encoder of the encoder-decoder architecture. In some embodiments, predictions, and/or other output from the parameterized model are generated by the decoder of the encoder-decoder architecture. It should be noted that parameterized model may be trained for predicting and/or otherwise determining any target design and/or metrology measurement recipe parameters. For example, the parameterized model may be used for an overlay target design and/or measurement recipe parameters, a target after etch image and/or measurement recipe parameters, an image based overlay target design and/or measurement recipe parameters, a focus target design and/or measurement recipe parameters, an alignment target design and/or measurement recipe parameters, and/or other targets and/or measurement recipe parameters.

As described above, one parameterized model may be trained to predict complex electric field images, transform data from different sensors and/or tools such that data for the same target matches, and determine an optimum target design and/or manufacturing recipe; or these different operations may be performed by different parameterized models. The different applications (predicting complex electric field images, transforming data from different sensors and/or tools such that data for the same target from different sensors and/or tools still matches, and determining an optimum target design and/or manufacturing recipe) may be used together, or they may be used separately.

As an example, the present system(s) and method(s) may be configured to predict process information such as matching data for the same target from different sensors and/or tools and optimum target designs and/or manufacturing recipes (e.g., a combination of two of the three applications described herein) with a single parameterized model. In other words, the parameterized model may be configured to co-optimize a target design and measurement recipe parameters. This may include determining, in the latent space of the parameterized model, a latent space representation of a given input to the parameterized model (e.g., as described above). The latent space representation of the given input may be transformed, based on a reference latent space representation for the given input, into a transformed latent space representation of the given input (e.g., as described above). A latent space representation of an optimum set of process parameters associated with the given input may be determined based on the transformed latent space representation of the given input (e.g., as described above), and the process information may be predicted based on the transformed latent space representation of the given input and the latent space representation of the optimum set of process parameters associated with the given input.

As another example, the present system(s) and method(s) may be configured to predict process information such as complex electric field images, matching data for the same target from different sensors and/or tools, and optimum target designs and/or manufacturing recipes (e.g., a combination of all three applications described herein) with a single parameterized model. This may include determining, in the latent space of the parameterized model, a latent space representation of a given input to the parameterized model (e.g., as described herein), transforming the latent space representation of the given input, based on a reference latent space representation for the given input, into a transformed latent space representation of the given input; determining, based on the transformed latent space representation of the given input, a latent space representation of an electric field image for the given input; determining, based on the transformed latent space representation, a latent space representation of an optimum set of process parameters associated with the given input; predicting the process information based on the transformed latent space representation of the given input, the latent space representation of the electric field image, and the latent space representation of the optimum set of process parameters associated with the given input; and/or other operations.

It should be noted that although the description herein often refers to a (single) latent space, this should not be considered limiting. The principles described herein may be applied with and/or to any number of latent spaces. For example, the systems, methods, (metrology) apparatus, non-transitory computer readable media, etc., described herein may be configured such that a determination, based on dimensional data in one or more latent spaces of a parameterized model (or one or more parameterized models), of a latent space representation of an electric field image is made for a given input to the parameterized model. The electric field image may be determined based on the latent space representation of the electric field image and or other information. As described above, in some embodiments, the electric field image comprises a complex electric field image having an amplitude and a phase, and the given input comprises a measured amplitude associated with the complex electric field image. Determining the latent space representation of the electric field image comprises minimizing a function constrained by a set of electric field images that could be predicted by the parameterized model based on the dimensional data in the one or more latent spaces and the given input.

The one or more latent spaces may be used in series (e.g., for analyzing data and/or making a first prediction, then a second, etc.), in parallel (e.g., for analyzing data and/or making predictions simultaneously), and/or in other ways. Advantageously, individual latent spaces of the parameterized model may be more robust compared to a single latent space. For example, separate latent spaces may be focused on specific properties of a dataset, e.g. one for a retrieving phase, another for classification based on measurement parameters, etc. One combined latent space may be configured to capture all possibilities, while in the case of separate latent spaces, each individual latent space may be configured to (e.g., trained to) focus on a specific topic and/or aspect of a dataset. Individual latent spaces may potentially be simpler but be better at capturing information (e.g., when set up accordingly).

In some embodiments, the one or more latent spaces may comprise at least two latent spaces, a plurality of latent spaces, and/or other quantities of latent spaces, with individual latent spaces corresponding to different regimes of the parameterized model. The different regimes of the parameterized model may comprise an encoding regime (e.g., 91 shown in FIG. 9), a decoding regime (e.g., 94 shown in FIG. 9), a complex electric field parameter determination regime (e.g., a regime that determines inputs 92 shown in FIG. 9 and/or other features of an input electric field image), a phase retrieval regime (e.g., similar to and/or the same as 94 shown in FIG. 9), and/or other regimes. In some embodiments, the different regimes may correspond to different operations performed by a parameterized model (or one or more parameterized models). By way of a non-limiting example, in some embodiments, multiple latent spaces may be used in parallel, e.g., one for the image encoding and/or decoding, another for predicting aberrations, another for recipe settings (e.g., predicting or recommending process set points), etc. Individual latent spaces that correspond to different regimes may be more robust compared to a single latent space associated with multiple regimes.

In some embodiments, individual latent spaces may be associated with different independent parameters and corresponding dimensional data for the given input to the parameterized model. Individual latent spaces that correspond to different independent parameters may also be more robust compared to a single latent space associated with multiple parameters. For example, in some embodiments, the present system(s) and method(s) may include or utilize a first latent space, for phase retrieval as described herein, and a second separate latent space that deals with disturbances which are tool-dependent (i.e., due to optical differences). The first latent space may be configured to (e.g., trained to) perform the phase retrieval, and independent of this first latent space, the second latent space may be configured to (e.g., trained to) deal with differences in an image caused by tool specific properties. It should be noted that this is just one possible example, and is not intended to be limiting. Many other possible examples are contemplated.

Figure 10:
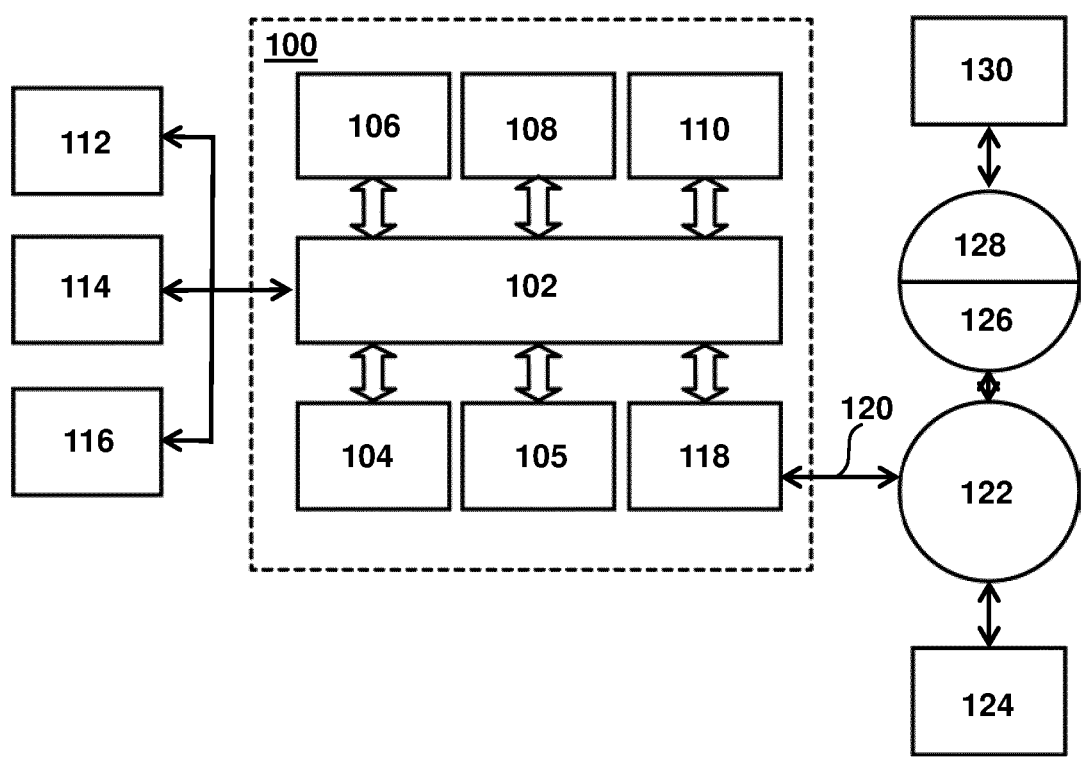
FIG. 10 is a block diagram of an example computer system, according to an embodiment.

FIG. 10 is a block diagram that illustrates a computer system 100 that can perform and/or assist in implementing the methods, flows, systems or the apparatus disclosed herein. Computer system 100 includes a bus 102 or other communication mechanism for communicating information, and a processor 104 (or multiple processors 104 and 105) coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT) or flat panel or touch panel display for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane. A touch panel (screen) display may also be used as an input device.

According to one embodiment, portions of one or more methods described herein may be performed by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. One or more processors in a multi-processing arrangement may also be employed to execute the sequences of instructions contained in main memory 106. In an alternative embodiment, hard-wired circuitry may be used in place of or in combination with software instructions. Thus, the description herein is not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media include, for example, optical or magnetic disks, such as storage device 110. Volatile media include dynamic memory, such as main memory 106. Transmission media include coaxial cables, copper wire and fiber optics, including the wires that comprise bus 102. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be borne on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector coupled to bus 102 can receive the data carried in the infrared signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 may also include a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the worldwide packet data communication network, now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120, and communication interface 118. In the Internet example, a server 130 might transmit a requested code for an application program through Internet 128, ISP 126, local network 122 and communication interface 118. One such downloaded application may provide all or part of a method described herein, for example. The received code may be executed by processor 104 as it is received, and/or stored in storage device 110, or other non-volatile storage for later execution. In this manner, computer system 100 may obtain application code in the form of a carrier wave.

Figure 11:
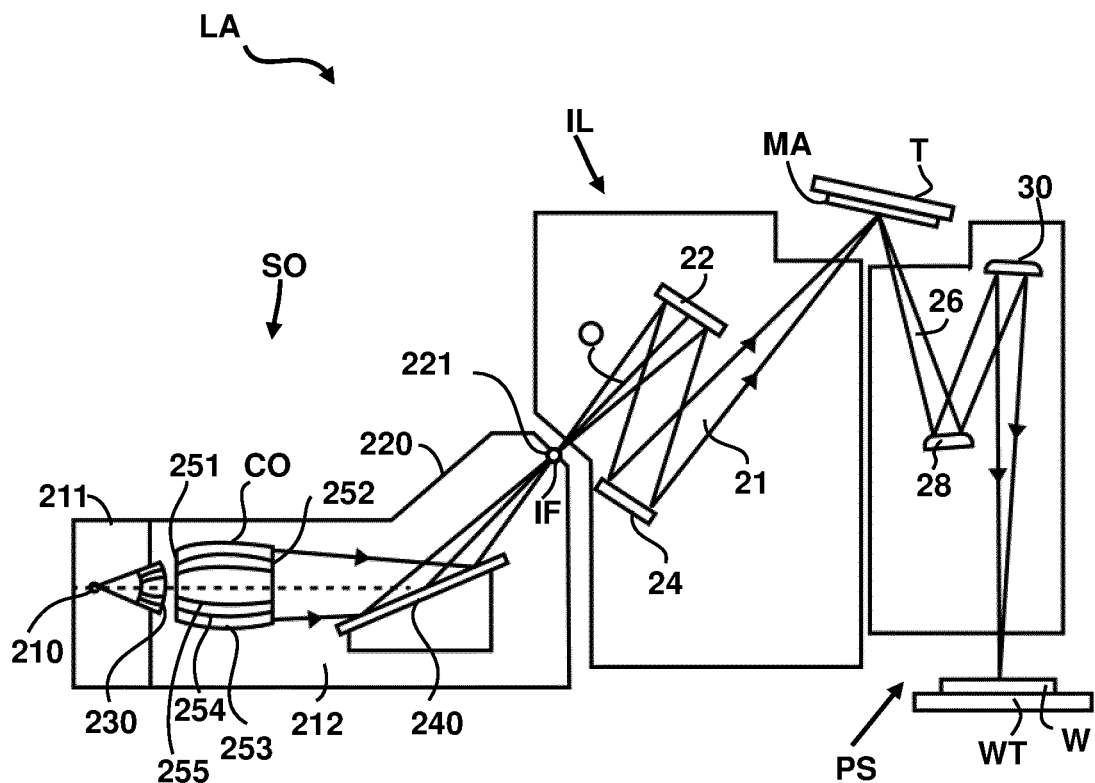
FIG. 11 is an alternative design for the lithography apparatus of FIG. 1, according to an embodiment.

FIG. 11 is a detailed view of an alternative design for the lithographic projection apparatus LA shown in FIG. 1. (FIG. 1 relates to DUV radiation because lenses are used and a transparent reticle is used, while FIG. 11 relates to a lithographic apparatus which uses EUV radiation because mirrors and a reflective reticle are used.) As shown in FIG. 11, the lithographic projection apparatus can include the source SO, the illumination system IL, and the projection system PS. The source SO is configured such that a vacuum environment can be maintained in an enclosing structure 220 of the source SO. An EUV (for example) radiation emitting plasma 210 may be formed by a discharge produced plasma source. EUV radiation may be produced by a gas or vapor, for example Xe gas, Li vapor or Sn vapor in which plasma 210 is created to emit radiation in the EUV range of the electromagnetic spectrum. The plasma 210 is created by, for example, an electrical discharge causing at least partially ionized plasma. Partial pressures of, for example, 10 Pa of Xe, Li, Sn vapor or any other suitable gas or vapor may be required for efficient generation of the radiation. In some embodiments, a plasma of excited tin (Sn) is provided to produce EUV radiation.

The radiation emitted by plasma 210 is passed from a source chamber 211 into a collector chamber 212 via an optional gas barrier or contaminant trap 230 (in some cases also referred to as contaminant barrier or foil trap) which is positioned in or behind an opening in source chamber 211. The contaminant trap 230 may include a channel structure. Chamber 211 may include a radiation collector CO which may be a grazing incidence collector, for example. Radiation collector CO has an upstream radiation collector side 251 and a downstream radiation collector side 252. Radiation that traverses collector CO can be reflected off a grating spectral filter 240 to be focused in a virtual source point IF along the optical axis indicated by the line 'O'. The virtual source point IF is commonly referred to as the intermediate focus, and the source is arranged such that the intermediate focus IF is located at or near an opening 221 in the enclosing structure 220. The virtual source point IF is an image of the radiation emitting plasma 210.

Subsequently, the radiation traverses the illumination system IL, which may include a facetted field mirror device 22 and a facetted pupil mirror device 24 arranged to provide a desired angular distribution of the radiation beam 21, at the patterning device MA, as well as a desired uniformity of radiation intensity at the patterning device MA. Upon reflection of the radiation beam 21 at the patterning device MA, held by the support structure (table) T, a patterned beam 26 is formed and the patterned beam 26 is imaged by the projection system PS via reflective elements 28, 30 onto a substrate W held by the substrate table WT. More elements than shown may generally be present in illumination optics unit IL and projection system PS. The grating spectral filter 240 may optionally be present, depending upon the type of lithographic apparatus, for example. Further, there may be more mirrors present than those shown in the figures, for example there may be 1-6 additional reflective elements present in the projection system PS than shown in FIG. 11.

Collector optic CO, as illustrated in FIG. 11, is depicted as a nested collector with grazing incidence reflectors 253, 254 and 255, just as an example of a collector (or collector mirror). The grazing incidence reflectors 253, 254 and 255 are disposed axially symmetric around the optical axis O and a collector optic CO of this type may be used in combination with a discharge produced plasma source, often called a DPP source.

Further embodiments are disclosed in the subsequent list of numbered clauses:

1. A method for determining one or more metrology metrics for a semiconductor manufacturing process, the method comprising:
    determining, based on dimensional data in a latent space of a parameterized model, a latent space representation of an electric field image for a given input;

predicting, with the parameterized model, the electric field image based on the latent space representation of the electric field image; and
determining the one or more metrology metrics for the semiconductor manufacturing process based on the predicted electric field image.

2. The method of clause 1, wherein the electric field image comprises a complex electric field image having an amplitude and a phase.

3. The method of any of clauses 1-2, wherein the one or more determined metrology metrics comprise one or more of overlay, a critical dimension, a reconstruction of a three dimensional profile of features of a substrate, or a dose or focus of a lithography apparatus at a moment when the features of the substrate were printed with the lithography apparatus.

4. The method of any of clauses 1-3, wherein the electric field image comprises a complex electric field image, and wherein the given input comprises a measured amplitude associated with the complex electric field image.

5. The method of clause 4, wherein the amplitude comprises an intensity.

6. The method of any of clauses 1-5, further comprising adjusting one or more semiconductor manufacturing process parameters based on the determined one or more metrology metrics.

7. A method for predicting electric field images with a parameterized model, the method comprising:
determining, based on dimensional data in a latent space of the parameterized model, a latent space representation of an electric field image for a given input to the parameterized model; and
predicting the electric field image based on the latent space representation of the electric field image.

8. The method of clause 7, wherein the electric field image comprises a complex electric field image having an amplitude and a phase.

9. The method of clause 8, wherein the given input comprises a measured amplitude associated with the complex electric field image.

10. The method of clause 9, wherein the amplitude comprises an intensity.

11. The method of any of clauses 7-10, wherein determining the latent space representation of the electric field image comprises minimizing a function constrained by a set of electric field images that could be predicted by the parameterized model based on the dimensional data in the latent space and the given input.

12. The method of clause 11, wherein the latent space representation of the electric field image comprises a tensor.

13. The method of any of clauses 7-12, wherein the parameterized model is a machine learning model.

14. The method of any of clauses 7-13, wherein the parameterized model comprises encoder-decoder architecture.

15. The method of clause 14, wherein the encoder-decoder architecture comprises variational encoder-decoder architecture, the method further comprising training the variational encoder-decoder architecture with a probabilistic latent space, which generates realizations in an output space.

16. The method of clause 15, wherein the latent space comprises low dimensional encodings.

17. The method of any of clauses 14-16, wherein the dimensional data in the latent space is encoded by an encoder of the encoder-decoder architecture.

18. The method of any of clauses 14-17, further comprising training the parameterized model with a training set of complex electric field images.

19. The method of clause 18, wherein the set of complex electric field images is generated on basis of a through focus measurement and optionally a complex electric field image reconstruction algorithm.

20. The method of clause 18 or 19, wherein the training comprises encoding the complex electric field images in the training set into the dimensional data in the latent space, and transforming the dimensional data in the latent space into recovered versions of the complex electric field images in the training set to facilitate verification of the training.

21. The method of clause 20, further comprising iteratively providing additional complex electric field images as input to the parameterized model, the additional complex electric field images determined based on an extent to which the recovered versions of the complex electric field images match the complex electric field images in the training set.

22. The method of any of clauses 16-21, further comprising encoding, with the encoder, higher dimensional data associated with the electric field images into the dimensional data in the latent space.

23. The method of any of clauses 14-22, wherein predicting the electric field image based on the latent space representation of the electric field image comprises passing the latent space representation of the electric field image through a decoder of the encoder-decoder architecture.

24. The method of any of clauses 7-23, further comprising determining a metrology metric based on the latent space representation of the electric field image.

25. The method of clause 24, wherein determining the metrology metric based on the latent space representation of the electric field image comprises providing the latent space representation of the electric field image to a regression network that is included in or separate from the parameterized model.

26. The method of clause 24 or 25, wherein the metrology metric is overlay.

27. The method of any of clauses 7-26, further comprising correcting for aberrations associated with a metrology apparatus based on the latent space representation of the electric field image and/or the predicted electric field image.

28. The method of any of clauses 7-27, further comprising determining, based on the predicted electric field image, adjustments to semiconductor manufacturing process parameters for patterning substrate geometry as part of a semiconductor manufacturing process.

29. A non-transitory computer readable medium having instructions thereon, the instructions when executed by a computer implementing the method of any of clauses 1-28.

30. A metrology apparatus configured to determine one or more metrology metrics for a semiconductor manufacturing process, the apparatus comprising one or more processors configured to:
determine, based on dimensional data in a latent space of a parameterized model, a latent space representation of an electric field image for a given input;

predict, with the parameterized model, the electric field image based on the latent space representation of the electric field image; and
determine the one or more metrology metrics for the semiconductor manufacturing process based on the predicted electric field image.

31. A lithographic cell comprising a metrology apparatus, the metrology apparatus configured to:
determine, based on dimensional data in a latent space of a parameterized model, a latent space representation of an electric field image for a given input;
predict, with the parameterized model, the electric field image based on the latent space representation of the electric field image; and
determine one or more metrology metrics for a semiconductor manufacturing process based on the predicted electric field image.

32. A method for predicting process information with a parameterized model, comprising:
determining, in a latent space of the parameterized model, a latent space representation of a given input to the parameterized model;
transforming the latent space representation of the given input, based on a reference latent space representation for the given input, into a transformed latent space representation of the given input; and
predicting the process information based on the transformed latent space representation of the given input.

33. The method of clause 32, wherein the given input is associated with a target, and received from one of a plurality of target characterization apparatuses configured to generate the given input; and
wherein the transforming and predicting are configured such that the predicted process information for the target is the same, independent of which one of the target characterization apparatuses generated the given input.

34. The method of clauses 32 or 33, wherein the transforming comprises one or more mathematical operations performed on the latent space representation of the given input.

35. The method of any of clauses 32-34, wherein the transforming is performed in the latent space.

36. The method of any of clauses 32-35, wherein the reference latent space representation comprises a weighted combination and/or an average of latent space representations of previously received inputs to the parameterized model, or a latent space representation of an input from a specific target characterization apparatus configured to generate the given input.

37. The method of any of clauses 32-36, wherein the process information and the given input are associated with a semiconductor manufacturing process.

38. The method of any of clauses 32-37, wherein the predicted process information comprises one or more of a predicted image, or a predicted process measurement.

39. The method of clause 37, wherein the predicted process measurement comprises one or more of a metrology metric, an xyz position, a dimension, an electric field, a wavelength, an illumination and/or detection pupil, a bandwidth, an illumination and/or detection polarization angle, or an illumination and/or a detection retardance angle.

40. The method of any of clauses 32-39, wherein the given input comprises one or more of an input image, or an input process measurement.

41. A method for predicting process information with a parameterized model, comprising:
determining, based on dimensional data, in a latent space of the parameterized model, a latent space representation of an optimum set of process parameters associated with a given input to the parameterized model; and
predicting the process information based on the latent space representation of the optimum set of process conditions.

42. The method of clause 41, wherein the predicted process information comprises one or more of a design parameter, or a metrology measurement recipe parameter, for a target.

43. The method of clause 42, wherein the design parameter comprises one or more of a critical dimension, a pitch, a segmentation pitch, line geometry, contact geometry, or hole geometry associated with the target.

44. The method of clause 42, wherein the metrology measurement recipe parameter comprises one or more of a wavelength, a bandwidth, an aperture, an illumination and/or detection pupil, a bandwidth, an illumination and/or detection polarization angle, an illumination and/or a detection retardance angle, or a dose for measuring the target.

45. The method of any of clauses 41-44, wherein the optimum set of process parameters define optimum measurement conditions for measuring a metrology metric for a target.

46. The method of clause 45, wherein the optimum set of process parameters comprise one or more of an intensity, a contrast, an edge response, a diffraction efficiency, or an overlay sensitivity.

47. The method of any of clauses 41-46, wherein the given input comprises one or more of a defined design parameter, or a defined metrology measurement recipe parameter, for a target.

48. The method of any of clauses 32-47, wherein the parameterized model is a machine learning model.

49. The method of any of clauses 42-48, wherein the parameterized model comprises encoder-decoder architecture.

50. The method of any of clauses 32-49, wherein the latent space comprises low dimensional encodings.

51. A method for predicting process information with a parameterized model, comprising:
determining, in a latent space of the parameterized model, a latent space representation of a given input to the parameterized model;
transforming the latent space representation of the given input, based on a reference latent space representation for the given input, into a transformed latent space representation of the given input;
determining, based on the transformed latent space representation, a latent space representation of an optimum set of process parameters associated with the given input; and
predicting the process information based on the transformed latent space representation of the given input and the latent space representation of the optimum set of process parameters associated with the given input.

52. A method for predicting process information with a parameterized model, comprising:
determining, in a latent space of the parameterized model, a latent space representation of a given input to the parameterized model;

transforming the latent space representation of the given input, based on a reference latent space representation for the given input, into a transformed latent space representation of the given input;

determining, based on the transformed latent space representation of the given input, a latent space representation of an electric field image for the given input;

determining, based on the transformed latent space representation, a latent space representation of an optimum set of process parameters associated with the given input; and predicting the process information based on the transformed latent space representation of the given input, the latent space representation of the electric field image, and the latent space representation of the optimum set of process parameters associated with the given input.

53. A non-transitory computer readable medium having instructions thereon, the instructions when executed by a computer implementing the method of any of clauses 32-52.

54. A non-transitory computer readable medium having instructions thereon, the instructions when executed by a computer causing the computer to:

determine, based on dimensional data in one or more latent spaces of a parameterized model, a latent space representation of an electric field image for a given input to the parameterized model; and predict the electric field image based on the latent space representation of the electric field image.

55. The medium of clause 54, wherein the one or more latent spaces comprise at least two latent spaces.

56. The medium of any of clauses 54 or 55, wherein the one or more latent spaces comprise a plurality of latent spaces, with individual latent spaces of the plurality of latent spaces corresponding to different regimes of the parameterized model.

57. The medium of clause 56, wherein the different regimes of the parameterized model comprise an encoding regime, a decoding regime, a complex electric field parameter determination regime, and/or a phase retrieval regime.

58. The medium of any of clauses 54-57, wherein the one or more latent spaces comprise at least two latent spaces associated with different independent parameters and corresponding dimensional data for the given input to the parameterized model.

59. The medium of any of clauses 54-58, wherein the electric field image comprises a complex electric field image having an amplitude and a phase, and the given input comprises a measured amplitude associated with the complex electric field image.

60. The medium of any of clauses 54-59, wherein determining the latent space representation of the electric field image comprises minimizing a function constrained by a set of electric field images that could be predicted by the parameterized model based on the dimensional data in the one or more latent spaces and the given input.

61. A method for predicting electric field images with a parameterized model, the method comprising:

determining, based on dimensional data in one or more latent spaces of the parameterized model, a latent space representation of an electric field image for a given input to the parameterized model; and predicting the electric field image based on the latent space representation of the electric field image.

62. The method of clause 61, wherein the one or more latent spaces comprise at least two latent spaces.

63. The method of any of clauses 61 or 62, wherein the one or more latent spaces comprise a plurality of latent spaces, with individual latent spaces of the plurality of latent spaces corresponding to different regimes of the parameterized model.

64. The method of clause 63, wherein the different regimes of the parameterized model comprise an encoding regime, a decoding regime, a complex electric field parameter determination regime, and/or a phase retrieval regime.

65. The method of any of clauses 61-64, wherein the one or more latent spaces comprise at least two latent spaces associated with different independent parameters and corresponding dimensional data for the given input to the parameterized model.

66. The method of any of clauses 61-65, wherein the electric field image comprises a complex electric field image having an amplitude and a phase, and the given input comprises a measured amplitude associated with the complex electric field image.

67. The method of any of clauses 61-66, wherein determining the latent space representation of the electric field image comprises minimizing a function constrained by a set of electric field images that could be predicted by the parameterized model based on the dimensional data in the one or more latent spaces and the given input.

68. A metrology apparatus comprising one or more processors configured to:

determine, based on dimensional data in one or more latent spaces of a parameterized model, a latent space representation of an electric field image for a given input to the parameterized model; and predict the electric field image based on the latent space representation of the electric field image.

69. The apparatus of clause 68, wherein the one or more latent spaces comprise at least two latent spaces.

70. The apparatus of any of clauses 68 or 69, wherein the one or more latent spaces comprise a plurality of latent spaces, with individual latent spaces of the plurality of latent spaces corresponding to different regimes of the parameterized model.

71. The apparatus of clause 70, wherein the different regimes of the parameterized model comprise an encoding regime, a decoding regime, a complex electric field parameter determination regime, and/or a phase retrieval regime.

72. The apparatus of any of clauses 68-71, wherein the one or more latent spaces comprise at least two latent spaces associated with different independent parameters and corresponding dimensional data for the given input to the parameterized model.

73. The apparatus of any of clauses 68-72, wherein the electric field image comprises a complex electric field image having an amplitude and a phase, and the given input comprises a measured amplitude associated with the complex electric field image.

74. The apparatus of any of clauses 68-73, wherein determining the latent space representation of the electric field image comprises minimizing a function constrained by a set of electric field images that could be predicted by the parameterized model based on the dimensional data in the one or more latent spaces and the given input.

75. A method for determining one or more metrology metrics for semiconductor manufacturing processes using machine learning algorithms, comprising:
   receiving, using control circuitry, a feature vector associated with an unknown electric field image, wherein the feature vector represents values corresponding to a latent space representation of an electric field image;
   inputting, using the control circuitry, the feature vector into a machine learning model, wherein the machine learning model comprises a generative classifier used to identify a known electric field image based on labeled feature vectors corresponding to latent space representations of electric field images, wherein the known electric field image is a higher dimensional representation of the latent space representation of the electric field image;
   receiving, using the control circuitry, a first prediction from the machine learning model, wherein the first prediction indicates whether the first feature vector corresponds to the known electric field image; and
   in response to the first prediction indicating that the first feature vector corresponds to the known electric field image, generating for display, on a user interface, a recommendation for a metrology metric for a semiconductor manufacturing process corresponding to the known electric field image.

The concepts disclosed herein may simulate or mathematically model any generic imaging system for imaging sub wavelength features, and may be especially useful with emerging imaging technologies capable of producing increasingly shorter wavelengths. Emerging technologies already in use include EUV (extreme ultra violet), DUV lithography that is capable of producing a 193 nm wavelength with the use of an ArF laser, and even a 157 nm wavelength with the use of a Fluorine laser. Moreover, EUV lithography is capable of producing wavelengths within a range of 20-5 nm by using a synchrotron or by hitting a material (either solid or a plasma) with high energy electrons in order to produce photons within this range.

While the concepts disclosed herein may be used for imaging on a substrate such as a silicon wafer, it shall be understood that the disclosed concepts may be used with any type of lithographic imaging systems, e.g., those used for imaging on substrates other than silicon wafers, and/or metrology systems. In addition, the combination and subcombinations of disclosed elements may comprise separate embodiments. For example, predicting a complex electric field image and determining a metrology metric such as overlay may be performed by the same parameterized model and/or different parameterized models. These features may comprise separate embodiments, and/or these features may be used together in the same embodiment.

Although specific reference may be made in this text to embodiments of the invention in the context of a metrology apparatus, embodiments of the invention may be used in other apparatus. Embodiments of the invention may form part of a mask inspection apparatus, a lithographic apparatus, or any apparatus that measures or processes an object such as a wafer (or other substrate) or mask (or other patterning device). These apparatus may be generally referred to as lithographic tools. Such a lithographic tool may use vacuum conditions or ambient (non-vacuum) conditions.

Although specific reference may have been made above to the use of embodiments of the invention in the context of optical lithography, it will be appreciated that the invention, where the context allows, is not limited to optical lithography and may be used in other applications, for example imprint lithography. While specific embodiments of the invention have been described above, it will be appreciated that the invention may be practiced otherwise than as described. The descriptions above are intended to be illustrative, not limiting. Thus it will be apparent to one skilled in the art that modifications may be made to the invention as described without departing from the scope of the claims set out below.

What is claimed is:

1. A computer-implemented method for improving metrology outputs during a semiconductor manufacturing process, comprising:
   determining, using a first portion of a parameterized model, a latent space representation of an input electric field image, wherein the latent space representation has a lower dimensionality than the input electric field image;
   predicting, using a second portion of the parameterized model, an output electric field image based on the latent space representation of the input electric field image, wherein the output electric field image includes amplitude and phase information; and
   determining, using a third portion of the parameterized model, one or more metrology metrics for the semiconductor manufacturing process, wherein input to the third portion of the parameterized model includes one of the input electric field image, the output electric field image, or the latent space representation of the input electric field image; and
   adjusting the one or more metrology metrics during the semiconductor manufacturing process.

2. The method of claim 1, wherein:
   input to the first portion of the parameterized model further comprises a measured amplitude associated with the input electric field image, and
   the amplitude comprises an intensity.

3. The method of claim 1, wherein:
   the determining the latent space representation of the input electric field image comprises minimizing a function constrained by a set of electric field images predicted by the parameterized model based on the dimensional data in a latent space of the parameterized model, and
   the latent space representation of the input electric field image comprises a tensor.

4. The method of claim 1, wherein the parameterized model is a machine learning model.

5. The method of claim 1, wherein the first and second portions of the parameterized model comprise encoder-decoder architecture.

6. The method of claim 5, wherein the encoder-decoder architecture comprises variational encoder-decoder architecture and the method further comprises:
   training the variational encoder-decoder architecture with a probabilistic latent space that generates realizations in an output space.

7. The method of claim 6, wherein the probabilistic latent space comprises low dimensional encodings.

8. The method of claim 5, wherein the dimensional data in the latent space of the parameterized model is encoded by an encoder of the encoder-decoder architecture.

9. The method of claim 5, further comprising: training the parameterized model with a training set of complex electric field images.

10. The method of claim 9, wherein the training comprises:
encoding the complex electric field images in the training set into the dimensional data in the latent space of parameterized model,
transforming the dimensional data in the latent space of the parameterized model into recovered versions of the complex electric field images in the training set to facilitate verification of the training, and
iteratively providing additional complex electric field images as input to the parameterized model, the additional complex electric field images determined based on an extent to which the recovered versions of the complex electric field images match the complex electric field images in the training set.

11. The method of claim 5, wherein the predicting the output electric field image based on the latent space representation of the input electric field image comprises passing the latent space representation of the input electric field image through a decoder of the encoder-decoder architecture.

12. The method of claim 1, wherein the third portion of the parameterized model is a regression model.

13. A metrology apparatus comprising one or more processors configured to perform operations comprising:
determining, using a first portion of a parameterized model, a latent space representation of an input electric field image, wherein the latent space representation has a lower dimensionality than the input electric field image;
predicting, using a second portion of the parameterized model, an output electric field image based on the latent space representation of the input electric field image, wherein the input electric field image includes amplitude and phase information;
determining, using a third portion of the parameterized model, one or more metrology metrics for a semiconductor manufacturing process, wherein input to the third portion of the parameterized model includes one of: the input electric field image, the output electric field image, or the latent space representation; and
adjusting one or more parameters of the metrology apparatus used during a semiconductor manufacturing process used the one or more metrology metrics.

* * * * *